US012651313B2

(12) United States Patent
Hinz et al.

(10) Patent No.: US 12,651,313 B2
(45) Date of Patent: Jun. 9, 2026

(54) HIGH-RESOLUTION IMAGE GENERATION USING A DIFFUSION MODEL AND A GENERATIVE ADVERSARIAL NETWORK

(71) Applicant: ADOBE INC., San Jose, CA (US)

(72) Inventors: Tobias Hinz, Campbell, CA (US); Taesung Park, San Francisco, CA (US); Jingwan Lu, Sunnyvale, CA (US); Elya Shechtman, Seattle, WA (US); Richard Zhang, Burlingame, CA (US); Oliver Wang, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/585,957

(22) Filed: Feb. 23, 2024

(65) Prior Publication Data

US 2024/0320789 A1    Sep. 26, 2024

Related U.S. Application Data

(60) Provisional application No. 63/491,237, filed on Mar. 20, 2023.

(51) Int. Cl.
*G06N 3/0475*        (2023.01)
*G06T 3/4046*        (2024.01)
(Continued)

(52) U.S. Cl.
CPC ......... *G06T 3/4053* (2013.01); *G06N 3/0475* (2023.01); *G06T 3/4046* (2013.01); *G06T 11/00* (2013.01); *G06T 2207/20081* (2013.01)

(58) Field of Classification Search
None
See application file for complete search history.

(56) References Cited

U.S. PATENT DOCUMENTS 10,713,821 B1    7/2020    Surya et al.
12,020,400 B2    6/2024    Hsieh et al.
(Continued)

FOREIGN PATENT DOCUMENTS

CN        111062865 A      4/2020
GB        2621492 A1       2/2024
(Continued)

OTHER PUBLICATIONS

Zbinden, Robin; Implementing and Experimenting with Diffusion Models for Text-to-Image Generation; Sep. 2022; EPFL; p. 21-22; https://arxiv.org/pdf/2209.10948. (Year: 2022).*

(Continued)

*Primary Examiner* — Joni Hsu

(74) *Attorney, Agent, or Firm* — F. CHAU & ASSOCIATES, LLC

(57)        ABSTRACT

A method, non-transitory computer readable medium, apparatus, and system for image generation include obtaining an input image having a first resolution, where the input image includes random noise, and generating a low-resolution image based on the input image, where the low-resolution image has the first resolution. The method, non-transitory computer readable medium, apparatus, and system further include generating a high-resolution image based on the low-resolution image, where the high-resolution image has a second resolution that is greater than the first resolution.

20 Claims, 20 Drawing Sheets

(51) Int. Cl.
  *G06T 3/4053* (2024.01)
  *G06T 11/00* (2006.01)

(56) References Cited

U.S. PATENT DOCUMENTS

| | | | |
|---|---|---|---|
| 2017/0024855 A1 | 1/2017 | Liang et al. | |
| 2018/0240257 A1 | 8/2018 | Li et al. | |
| 2019/0095730 A1 | 3/2019 | Fu et al. | |
| 2020/0242823 A1 | 7/2020 | Gehlaut et al. | |
| 2020/0242964 A1* | 7/2020 | Wu | G09B 7/02 |
| 2021/0342984 A1 | 11/2021 | Lin et al. | |
| 2022/0038620 A1 | 2/2022 | Demers | |
| 2022/0108417 A1 | 4/2022 | Liu et al. | |
| 2022/0114698 A1 | 4/2022 | Liu | |
| 2022/0130499 A1 | 4/2022 | Zhou et al. | |
| 2022/0335572 A1 | 10/2022 | Seresht et al. | |
| 2023/0081171 A1 | 3/2023 | Zhang et al. | |
| 2023/0082567 A1 | 3/2023 | Suresha et al. | |
| 2023/0108422 A1* | 4/2023 | Brauer | G06T 3/4053 |
| | | | 702/2 |
| 2023/0154161 A1 | 5/2023 | Pham et al. | |
| 2023/0177810 A1 | 6/2023 | Xu et al. | |
| 2023/0230198 A1 | 7/2023 | Zhang et al. | |
| 2024/0037732 A1 | 2/2024 | Gong et al. | |
| 2024/0037822 A1 | 2/2024 | Aberman et al. | |
| 2024/0135683 A1* | 4/2024 | Li | G06V 20/13 |
| 2024/0171788 A1* | 5/2024 | Kreis | G06T 3/4053 |
| 2024/0185035 A1 | 6/2024 | Yu et al. | |
| 2024/0193726 A1 | 6/2024 | Misra et al. | |
| 2024/0221235 A1 | 7/2024 | Gafni et al. | |
| 2024/0264718 A1 | 8/2024 | Benedetto et al. | |
| 2024/0265204 A1 | 8/2024 | Meeks et al. | |
| 2024/0282016 A1 | 8/2024 | Liu et al. | |
| 2025/0209712 A1* | 6/2025 | Svitov | G06T 17/20 |

FOREIGN PATENT DOCUMENTS

| | | |
|---|---|---|
| GB | 118521474 A | 2/2024 |
| KR | 10-2021-0121537 A | 10/2021 |
| WO | WO2022156350 A1 | 7/2022 |

OTHER PUBLICATIONS

Zhu, Peihao; Improved StyleGAN Embedding: Where are the Good Latents ?; Oct. 2021; p. 1-2; https://arxiv.org/pdf/2012.09036. (Year: 2021).*

Wang, X.; Deep Multi-Task Learning for Diabetic Retinopathy Grading in Fundus Images; May 2021; Proceedings of the AAAI Conference on Artificial Intelligence; 35(4); p. 2826-2834; https://doi.org/10.1609/aaai.v35i4.16388. (Year: 2021).*

Li, Kun; MILI: Multi-person inference from a low-resolution image; Mar. 2023; Fundamental Research; vol. 3, Issue 3; p. 434-441; https://doi.org/10.1016/j.fmre.2023.02.006. (Year: 2023).*

Office Action dated Jul. 3, 2025 in related U.S. Appl. No. 18/170,963. CN 111062865-A ((Machine Translation on Mar. 6, 2025).

Office Action dated Mar. 12, 2025 in related U.S. Appl. No. 18/170,963.

Office Action dated May 20, 2025 in related U.S. Appl. No. 18/171,046.

Karras, et al., "Analyzing and Improving the Image Quality of StyleGAN", arXiv preprint arXiv:1912.04958v2 [cs.CV] Mar. 23, 2020, 21 pages.

Kim, et al., "The Lipschitz Constant of Self-Attention", arXiv preprint arXiv:2006.04710v2 [stat.ML] Jun. 9, 2021, 26 pages.

Kumari, et al., "Ensembling Off-the-shelf Models for GAN Training", arXiv preprint arXiv:2112.09130v3 [cs.CV] May 4, 2022, 35 pages.

Lee, et al., "ViTGAN: Training GANs with Vision Transformers", In International Conference on Learning Representations (ICLR), Apr. 2022, 18 pages.

Liang, et al., "CPGAN: Content-Parsing Generative Adversarial Networks for Text-to-Image Synthesis", arXiv preprint arXiv:1912.08562v2 [cs.CV] Jul. 12, 2020, 18 pages.

Miyato, et al., "cGANs with Projection Discriminator", arXiv preprint arXiv:1802.05637v2 [cs.LG] Aug. 15, 2018, 21 pages.

Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.

Van den Oord, et al., "Representation Learning with Contrastive Predictive Coding", arXiv preprint arXiv:1807.03748v2 [cs.LG] Jan. 22, 2019, 13 pages.

Park, et al., "Contrastive Learning for Unpaired Image-to-Image Translation", arXiv preprint arXiv:2007.15651v3 [cs.CV] Aug. 20, 2020, 29 pages.

Radford, et al., "Learning Transferable Visual Models from Natural Language Supervision", arXiv preprint arXiv:2103.00020v1 [cs.CV] Feb. 26, 2021, 48 pages.

Brock, et al., "Large Scale GAN Training for High Fidelity Natural Image Synthesis", arXiv preprint arXiv:1809.11096v2 [cs.LG] Feb. 25, 2019, 35 pages.

Radford, et al., "Unsupervised Representation Learning with Deep Convolutional Generative Adversarial Networks", arXiv preprint arXiv:1511.06434v2 [cs.LG] Jan. 7, 2016, 16 pages.

Ramesh, et al., "Hierarchical Text-Conditional Image Generation with CLIP Latents", arXiv preprint arXiv:2204.06125v1 [cs.CV] Apr. 13, 2022, 27 pages.

Reed, et al., "Generative Adversarial Text to Image Synthesis", arXiv preprint arXiv:1605.05396v2 [cs.NE] Jun. 5, 2016, 10 pages.

Rombach, et al., "High-Resolution Image Synthesis with Latent Diffusion Models", arXiv preprint arXiv:2112.10752v2 [cs.CV] Apr. 13, 2022, 45 pages.

Saharia, et al., "Photorealistic Text-to-Image Diffusion Models with Deep Language Understanding", arXiv preprint arXiv:2205.11487v1 [cs.CV] May 23, 2022, 46 pages.

Sauer, et al., "StyleGAN-XL: Scaling StyleGAN to Large Diverse Datasets", arXiv preprint arXiv:2202.00273v2 [cs.LG] May 5, 2022, 19 pages.

Tanjim, et al., "DynamicRec: A Dynamic Convolutional Network for Next Item Recommendation", In Proceedings of the 29th ACM International Conference on Information and Knowledge Management (CIKM-2020), pp. 2237-2240, 2020, 4 p.

Tao, et al., "Df-Gan: A Simple and Effective Baseline for Text-to-Image Synthesis", arXiv preprint arXiv:2008.05865v4 [cs.CV] Oct. 15, 2022, 11 pages.

Vaswani, et al., "Attention is All You Need", arXiv preprint arXiv:1706.03762v5 [cs.CL] Dec. 6, 2017, 15 pages.

Wang, et al., "Understanding Contrastive Representation Learning through Alignment and Uniformity on the Hypersphere", arXiv preprint arXiv:2005.10242v10 [cs.LG] Aug. 15, 2022, 41 pages.

De Brabandere, et al., "Dynamic Filter Networks", arXiv preprint arXiv:1605.09673v2 [cs.LG] Jun. 6, 2016, 14 pages.

Wu, et al., "Pay Less Attention with Lightweight and Dynamic Convolutions", arXiv preprint arXiv:1901.10430v2 [cs.CL] Feb. 22, 2019, 14 pages.

Xu, et al., "AttnGAN: Fine-Grained Text to Image Generation with Attentional Generative Adversarial Networks", In IEEE Conference on Computer Vision and Pattern Recognition (CVPR), 2018, pp. 1316-1324, 9 pages.

Yu, et al., "Scaling Autoregressive Models for Content-Rich Text-to-Image Generation", arXiv preprint arXiv:2206.10789v1 [cs.CV] Jun. 22, 2022, 49 pages.

Zhang, et al., "Cross-Modal Contrastive Learning for Text-to-Image Generation", arXiv preprint arXiv:2101.04702v5 [cs.CV] Apr. 14, 2022, 19 pages.

Zhang, et al., "StackGAN: Text to Photo-realistic Image Synthesis with Stacked Generative Adversarial Networks", arXiv preprint arXiv:1612.03242v2 [cs.CV] Aug. 5, 2017, 14 pages.

Zhang, et al., "The Unreasonable Effectiveness of Deep Features as a Perceptual Metric", arXiv preprint arXiv:1801.03924v2 [cs.CV] Apr. 10, 2018, 14 pages.

Zhao, et al., "Large Scale Image Completion via Co-Modulated Generative Adversarial Networks", arXiv preprint arXiv:2103.10428v1 [cs.CV] Mar. 18, 2021, 25 pages.

(56)      References Cited

OTHER PUBLICATIONS

Zhu, et al., "DM-GAN: Dynamic Memory Generative Adversarial Networks for Text-to-Image Synthesis", arXiv preprint arXiv:1904. 01310v1 [cs.CV] Apr. 2, 2019, 9 pages.

Deng, et al., "Imagenet: A Large-Scale Hierarchical Image Database", In 2009 IEEE Conference on Computer Vision and Pattern Recognition, pp. 248-255, 2009, 8 pages.

Dhariwal, et al., "Diffusion Models beat GANs on Image Synthesis", arXiv preprint arXiv:2105.05233v4 [cs.LG] Jun. 1, 2021, 44 pages.

Goodfellow, et al., "Generative Adversarial Nets", arXiv preprint arXiv:1406.2661v1 [stat.ML] Jun. 10, 2014, 9 pages.

Ha, et al., "HyperNetworks", arXiv preprint arXiv:1609.09106v4 [cs.LG] Dec. 1, 2016, 29 pages.

Ho, et al., "Cascaded Diffusion Models for High Fidelity Image Generation", in Journal of Machine Learning Research 23, pp. 1-33, Jan. 2022, 33 pages.

Ho, et al., "Classifier-Free Diffusion Guidance", arXiv preprint arXiv:2207.12598v1 [cs.LG] Jul. 26, 2022, 14 pages.

Karras, et al., "A Style-Based Generator Architecture for Generative Adversarial Networks", arXiv preprint arXiv:1812.04948v3 [cs. NE] Mar. 29, 2019, 12 pages.

Combined Search and Examination Report dated Jun. 18, 2024 in corresponding United Kingdom Patent Application No. 2319189.3 (7 pages).

Li, et al., "Text to Realistic Image Generation with Attentional Concatenation Generative Adversarial Networks", Discrete Dynamics in Nature and Society, vol. 2020, Article ID 6452536, 10 pages.

Office Action dated Oct. 1, 2025 in relation U.S. Appl. No. 18/171,046.

Lüddecke, et al., "Image segmentation using text and image prompts", Proceedings of the IEEE/CVF conference on computer vision and pattern recognition, 2022, pp. 7086-7096, (Year: 2022).

Ma, et al., "AI illustrator: Translating raw descriptions into images by prompt-based cross-modal generation", Proceedings of the 30th ACM International Conference on Multimedia, 2022, pp. 4282-4290, (Year: 2022).

Office Action dated Aug. 13, 2025 in relation U.S. Appl. No. 18/426,763.

Office Action dated Sep. 16, 2025 in relation U.S. Appl. No. 18/439,036.

Office Action dated Jan. 13, 2026 in relation U.S. Appl. No. 18/439,036.

Office Action dated Jan. 26, 2026 in related U.S. Appl. No. 18/171,046.

Jain, et al., "Keys to Better Image Inpainting: Structure and Texture Go Hand in Hand", 2023 IEEE/CVF Winter Conference on Applications of Computer Vision (WACV), Waikoloa, HI, USA, 2023, pp. 208-217, doi:10.1109/WACV56688.2023.00029.

Office Action dated Apr. 2, 2026 in related U.S. Appl. No. 18/487,764.

* cited by examiner

Figure 2:
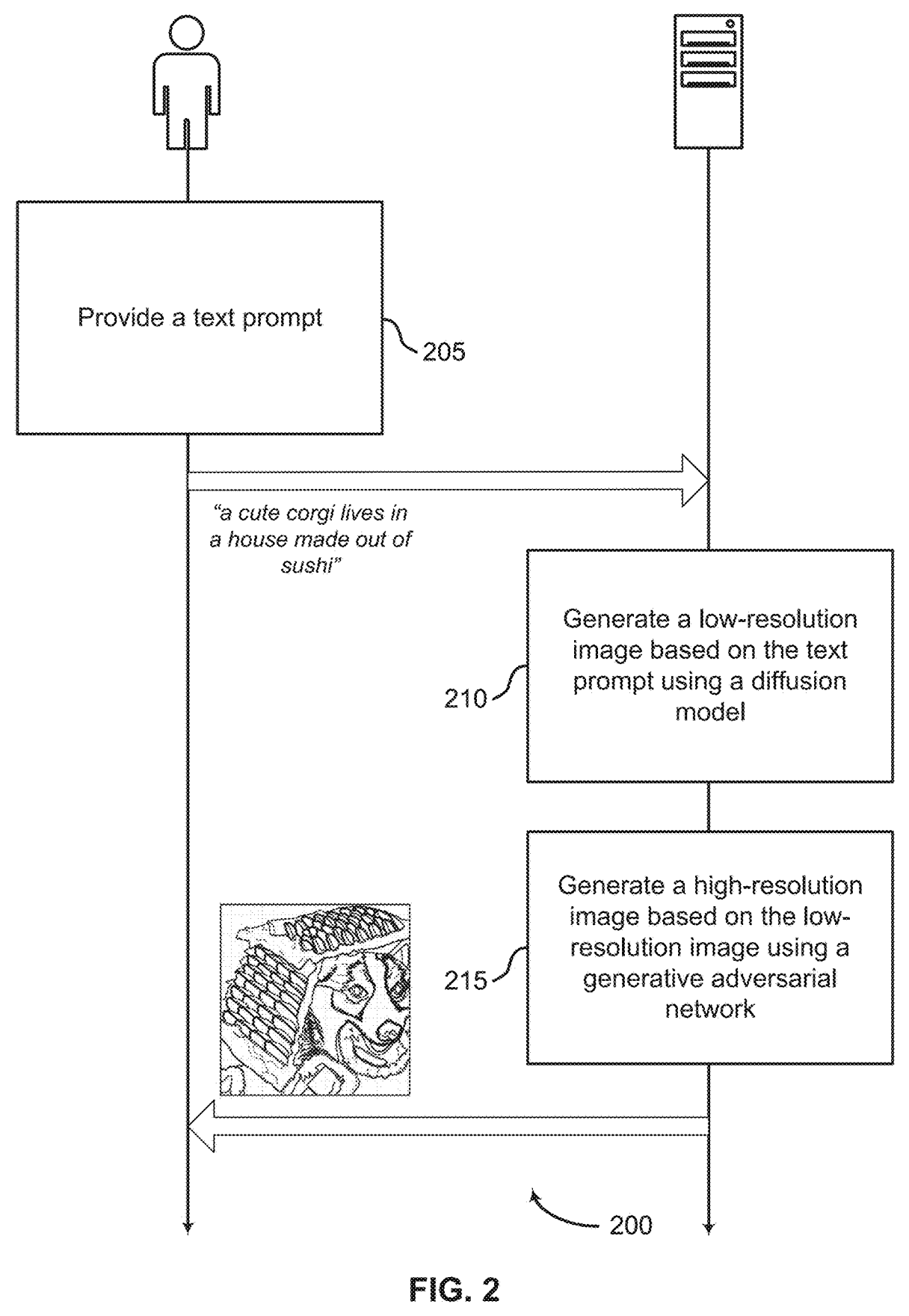

Provide a text prompt

205

"a cute corgi lives in a house made out of sushi"

Generate a low-resolution image based on the text prompt using a diffusion model

210

Generate a high-resolution image based on the low-resolution image using a generative adversarial network

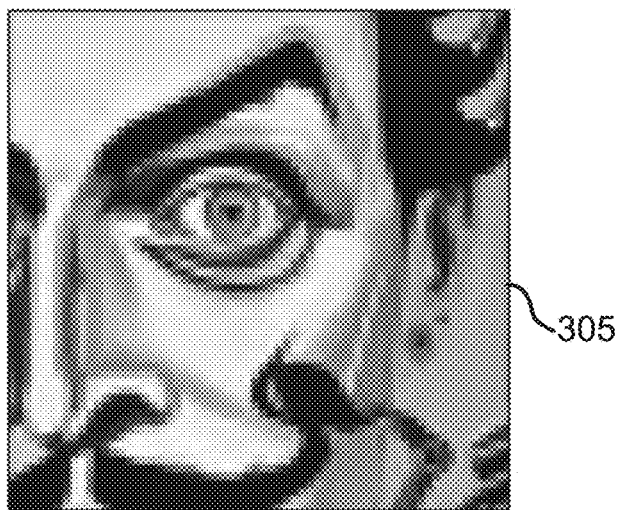
305
310
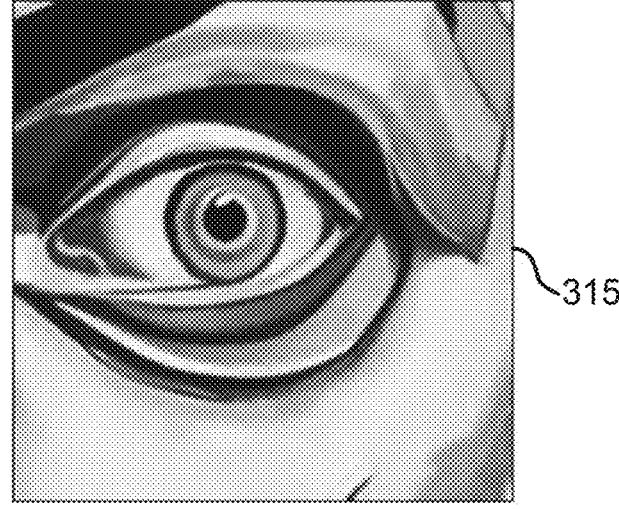
315
300
FIG. 3

Comparative Mapping Network 705

Latent $z \in Z$

740

Normalize

FC
FC
FC
FC
FC
FC
FC
FC

710

$\mathbf{w} \in \mathcal{W}$

745

Synthesis Network 715

755

Constant

750

720

A → style

Mod std

725

$W_2$ → Conv 3x3

730

735 → Norm std $b_2$ → ⊕

B

765

760

Noise

A → style

Mod std

Upsample $W_3$ → Conv 3x3

Norm std $b_3$ → ⊕

B

A → style

Mod std $W_4$ → Conv 3x3

Norm std $b_4$ → ⊕

B

....

700

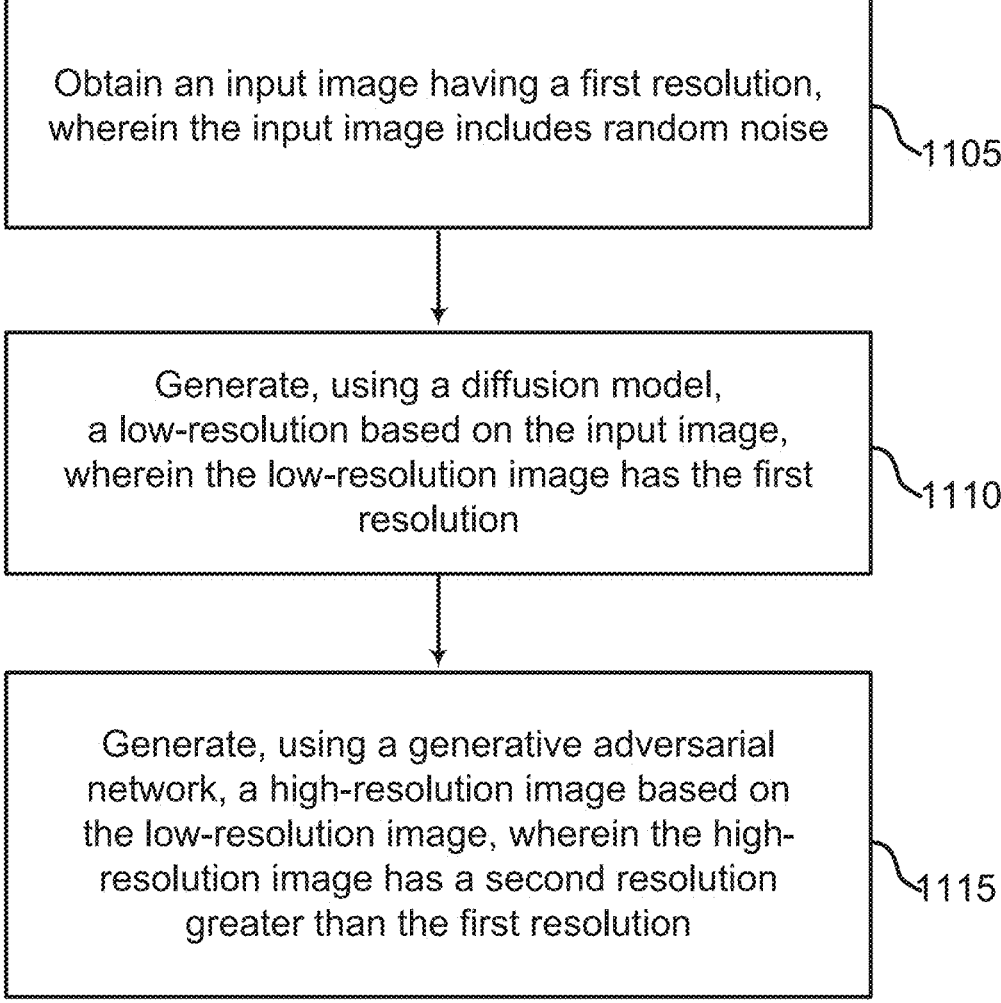

Obtain an input image having a first resolution, wherein the input image includes random noise ⌐1105

Generate, using a diffusion model, a low-resolution based on the input image, wherein the low-resolution image has the first resolution ⌐1110

Generate, using a generative adversarial network, a high-resolution image based on the low-resolution image, wherein the high-resolution image has a second resolution greater than the first resolution ⌐1115

Obtain a low-resolution image and a text description of the low-resolution image ⌐1305

Generate a style vector representing the text description of the low-resolution image ⌐1310

Generate an adaptive convolution filter based on the style vector ⌐1315

Generate a high-resolution image corresponding to the low-resolution image based on the adaptive convolution filter ⌐1320

1300

Generate a feature map based on
the low-resolution image

1605

Perform a convolution process on the feature
map based on the adaptive convolution filter

1610

Generate the high-resolution image
based on the convolution process

1615

1600

Initialize an untrained diffusion model    1705

Add noise to a training image using a forward diffusion process in *N* stages    1710

At each stage *n*, starting with stage *N*, predict an image for stage *n* − 1 using a reverse diffusion process    1715

Compare the predicted image at stage *n* − 1 to an actual image    1720

Update parameters of the diffusion model based on the comparison    1725

1700

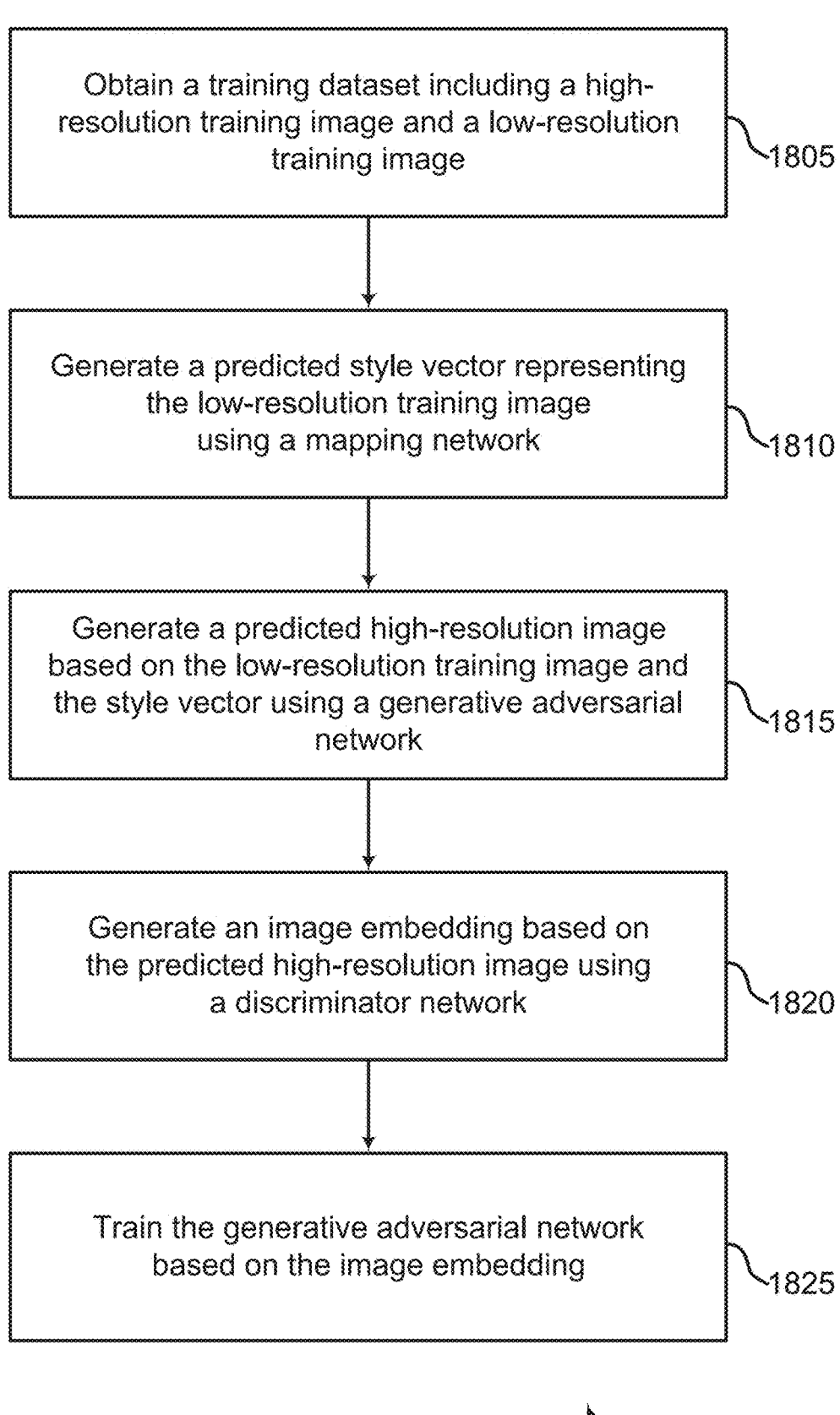

Obtain a training dataset including a high-resolution training image and a low-resolution training image ⟩1805

Generate a predicted style vector representing the low-resolution training image using a mapping network ⟩1810

Generate a predicted high-resolution image based on the low-resolution training image and the style vector using a generative adversarial network ⟩1815

Generate an image embedding based on the predicted high-resolution image using a discriminator network ⟩1820

Train the generative adversarial network based on the image embedding ⟩1825

Figure 20:
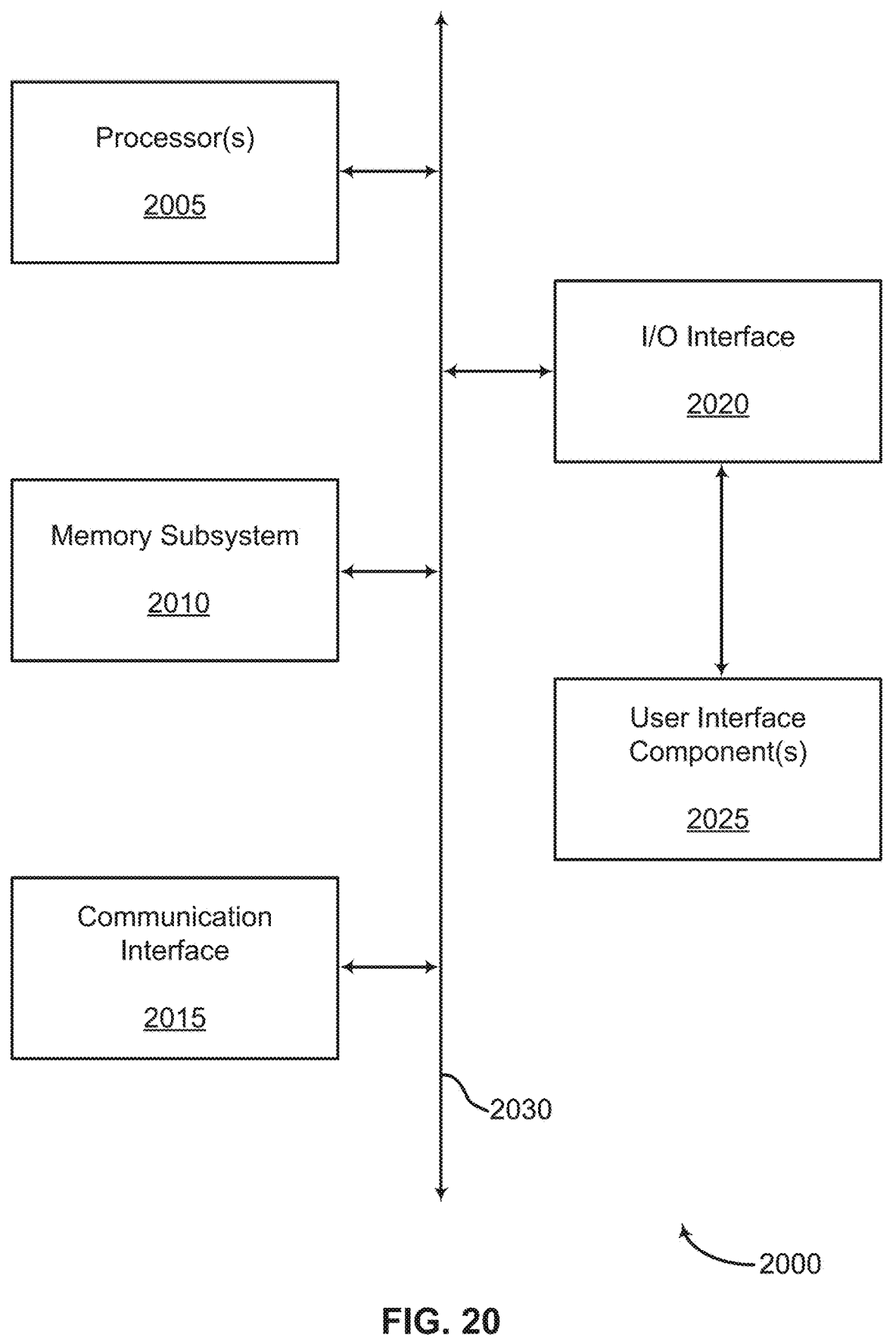

Processor(s)

2005

I/O Interface

2020

Memory Subsystem

2010

User Interface Component(s)

2025

Communication Interface

HIGH-RESOLUTION IMAGE GENERATION USING A DIFFUSION MODEL AND A GENERATIVE ADVERSARIAL NETWORK

CROSS-REFERENCE TO RELATED APPLICATION

This application claims priority under 35 U.S.C. § 119 to U.S. Provisional Application No. 63/491,237, filed on Mar. 20, 2023, in the United States Patent and Trademark Office, the disclosure of which is incorporated by reference herein in its entirety.

BACKGROUND

The following relates generally to machine learning, and more specifically to image generation using a machine learning model. Machine learning algorithms build a model based on sample data, known as training data, to make a prediction or a decision in response to an input without being explicitly programmed to do so.

One area of application for machine learning is image generation. For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

SUMMARY

Aspects of the present disclosure provide systems and methods for generating a high-resolution image. According to one aspect, an image generation system generates a low-resolution image using a diffusion model, and generates a high-resolution image based on the low-resolution image using a generative adversarial network.

In some cases, the diffusion model generates a high-quality low-resolution image. By using the generative adversarial network to generate a high-resolution image based on the low-resolution image, the image generation system provides a high-quality, high-resolution image in less time than a comparative diffusion model would take to produce an image of comparable resolution and quality.

A method, apparatus, and non-transitory computer readable medium for high-resolution image generation are described. One or more embodiments of the method, apparatus, and non-transitory computer readable medium include obtaining an input image having a first resolution, wherein the input image includes random noise; generating, using a diffusion model, a low-resolution image based on the input image, wherein the low-resolution image has the first resolution; and generating, using a generative adversarial network (GAN), a high-resolution image based on the low-resolution image, wherein the high-resolution image has a second resolution that is greater than the first resolution.

An apparatus and system for high-resolution image generation are described. One or more embodiments of the apparatus and system include one or more processors; one or more memory components coupled with the one or more processors; a diffusion model comprising diffusion parameters stored in the one or more memory components, the diffusion model trained to generate a low-resolution image;

and a generative adversarial network (GAN) comprising GAN parameters stored in the one or more memory components, the GAN trained to generate a high-resolution image based on the low-resolution image.

BRIEF DESCRIPTION OF THE DRAWINGS

FIG. 2 shows an example of a method for image generation according to aspects of the present disclosure.

FIG. 3 shows an example of an image with increased resolution according to aspects of the present disclosure.

FIG. 11 shows an example of a method for generating an image according to aspects of the present disclosure.

FIG. 18 shows an example of a method for training a generative adversarial network according to aspects of the present disclosure.

FIG. 20 shows an example of a computing device according to aspects of the present disclosure.

DETAILED DESCRIPTION

Figure 1:
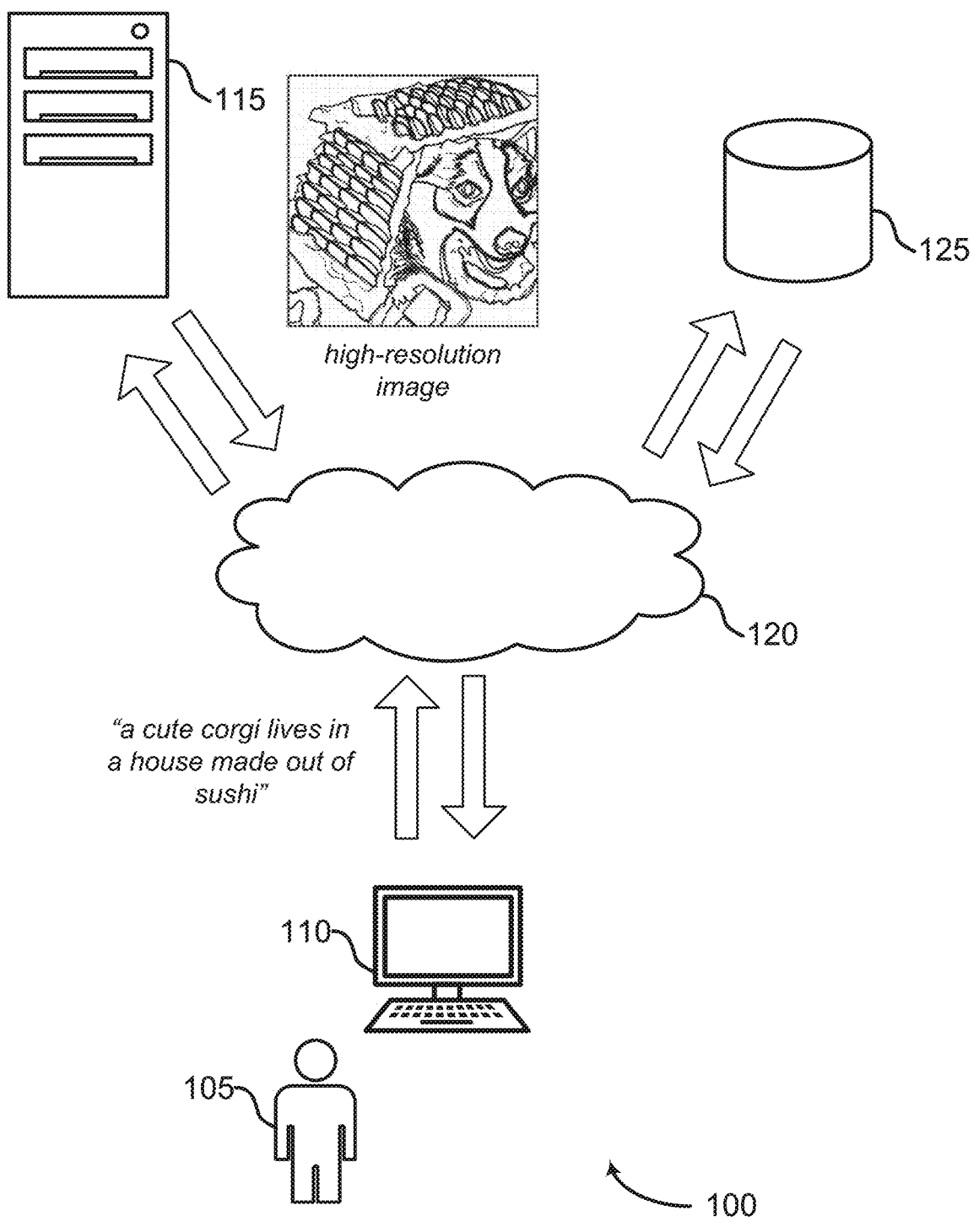
FIG. 1 shows an example of an image generation system according to aspects of the present disclosure.

Embodiments of the present disclosure relate generally to machine learning, and more specifically to image generation using a machine learning model. Machine learning algorithms build a model based on sample data, known as training data, to make a prediction or a decision in response to an input without being explicitly programmed to do so.

One area of application for machine learning is image generation. For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

One example of a current machine learning model that can generate an image based on a text input is a generative adversarial network (GAN), which is trained to produce a final output by iteratively refining an output of a synthesis network until a discriminator network is convinced that the output is "real", and diffusion models. GANs are inherently efficient because they can process an image through a single forward pass. However, the ability of comparative GAN-based machine learning models to produce a high-quality image output is hindered due to a relatively small convolutional capacity when used at a computationally practical scale, and comparative GAN-based machine learning models can suffer from training instability when trained using a large training dataset. Furthermore, comparative GANs mostly excel at generating aligned images from a single domain (e.g., faces) and perform worse when generating unaligned images from multiple domains.

Another example of an image-generating machine learning model is a diffusion model, which generates an output by removing noise from an input. Diffusion models can produce higher-quality output images than GANs. For example, diffusion models are able to model unaligned and diverse data and can be scaled to large model sizes without training instabilities. However, diffusion models can have a slower processing speed than GANs. While a GAN can generate an image using one forward pass, a diffusion model can use multiple forward passes to generate an image. In some cases, this is due to an iterative sampling process used by diffusion models (such as DALL-E2 and Imagen), which can take several seconds or even minutes to generate an image. As a resolution of an image to be generated increases, so does a diffusion model processing time.

Stable Diffusion is another example of a diffusion-based machine learning model. Stable Diffusion first trains an autoencoder to encode/decode images to/from a 64×64 latent space and then trains a diffusion model for the 64×64 latent space. The decoder is used at test time to generate high-resolution images from the 64×64 latent space, which is faster and cheaper than using a diffusion model. However, Stable Diffusion currently only supports a max resolution of 768×768 pixels, and using the autoencoder increases memory cost during training, requires high-resolution images for training, and tightly couples the autoencoder and diffusion model to each other (meaning if the autoencoder changes, the diffusion model has to be trained again).

Aspects of the present disclosure provide systems and methods for generating a high-resolution image. According to one aspect, a machine learning model of an image generation system generates a low-resolution image based on input text using a diffusion model, and generates a high resolution image for the low-resolution image using a GAN, thereby taking advantage of both the diffusion model (e.g., in some cases, a large-scale model that produces a high-quality, unaligned low-resolution image independently of a domain of the image or of a text prompt) and the GAN (e.g., a model that can quickly generate images) to generate a high-quality, high-resolution image at a faster processing speed than the diffusion model could provide by itself and at a higher quality than the GAN could produce by itself.

An embodiment of the present disclosure is used in a text-based image generation context. A user provides a text input to the image generation system that describes content of an image. In some cases, the image generation system uses a text-conditioned diffusion model to first generate a low-resolution (e.g., 128×128 pixel) RGB image and then uses a text-conditioned GAN model to up-sample the diffusion model's output to a high-resolution (e.g., 1024×1024 pixel) image. Accordingly, in some cases, the image generation system generates a high-resolution, high-quality image faster than DALL-E2/Imagen (since, in some cases, the GAN uses a single forward pass), generates a higher resolution image than Stable Diffusion, reduces a memory cost during training, allows the diffusion model to be trained using a low-resolution image, and allows both the diffusion model and the GAN to be trained in parallel as the diffusion model and the GAN might not directly depend on each other.

Further example applications of the present disclosure in the image generation context are provided with reference to FIGS. 1-3. Details regarding the architecture of the image generation system are provided with reference to FIGS. 1-10 and 20. Examples of a process for image generation are provided with reference to FIGS. 11-16. Examples of a process for training a machine learning model are provided with reference to FIGS. 17-19.

Embodiments of the present disclosure improve upon conventional image generation systems by generating high-resolution images faster and with fewer computational resources than conventional image generation. For example, some embodiments of the image generation system generate efficient high-resolution images by first generating an initial low-resolution image using a diffusion model and the upscaling the low-resolution image using a GAN. Accordingly, the described systems and methods provide the advantages of the high image quality provided by the diffusion model and the processing speed provided by the GAN. By contrast, conventional image generation systems either do not produce an image having a similar quality as the high-resolution image generated by the image generation system, or take longer to generate an image having a similar quality as the high-resolution image generated by the image generation system.

Image Generation System

A system and an apparatus for image generation is described with reference to FIGS. 1-10 and 20. One or more aspects of the system and apparatus include one or more processors; one or more memory components coupled with the one or more processors; a diffusion model comprising diffusion parameters stored in the one or more memory components, the diffusion model trained to generate a low-resolution image; and a generative adversarial network (GAN) comprising GAN parameters stored in the one or more memory components, the GAN trained to generate a high-resolution image based on the low-resolution image Some examples of the system and the apparatus further include a text encoder comprising text encoding parameters, the text encoder trained to generate a text embedding. In some cases, the high-resolution image is generated based on the text embedding. In some aspects, the diffusion model and the GAN each take the text embedding as input.

Some examples of the system and the apparatus further include an image encoder comprising image encoding parameters, the image encoder trained to generate an image embedding. In some cases, the high-resolution image is generated based on the image embedding. In some aspects, the diffusion model and the GAN each take the image embedding as input.

In some aspects, the diffusion model contains more parameters than the GAN. In some aspects, the low-resolution image is generated using multiple iterations of the diffusion model and the high-resolution image is generated using a single iteration of the GAN. In some aspects, at least one side of the low-resolution image comprises 128 pixels and at least one side of the high-resolution image comprises 1024 pixels.

In some aspects, an aspect ratio of the low-resolution image is different from 1:1 and the same as an aspect ratio of the high-resolution image. In some aspects, the diffusion model and the GAN take variable resolution inputs.

FIG. 1 shows an example of an image generation system 100 according to aspects of the present disclosure. The example shown includes image generation system 100, user 105, user device 110, image generation apparatus 115, cloud 120, and database 125.

In the example of FIG. 1, user 105 provides a text prompt (e.g., "a cute corgi lives in a house made of sushi") to image generation apparatus 115 via user device 110. Image generation apparatus 115 generates a low-resolution image based on the text prompt using a diffusion model, and generates a high-resolution image based on the low-resolution image using a GAN.

In some cases, image generation apparatus 115 generates the high-resolution image based on the text prompt. For example, in some cases, image generation apparatus 115 determines a style vector based on the text prompt. In some cases, image generation apparatus 115 determines the style vector based on a latent code.

In some cases, a "latent code" refers to a sequence of symbols sampled from a distribution in a latent space. As used herein, a "style vector" refers to a vector in an intermediate latent space that is relatively disentangled compared to the latent space. A goal of disentanglement can be to create a latent space that comprises linear subspaces, each of which controls one factor of variation in an output, such as an image; the separation of factors increases the quality of the output. However, a sampling probability of each combination of factors in the latent space matches a corresponding density in training data, which precludes the factors from being fully disentangled with typical datasets and input latent distributions, which reduces a quality of the output.

In some cases, the intermediate latent space is used because it does not have to support sampling according to any fixed distribution; rather, the sampling density of the intermediate latent space can be induced by a learned piecewise continuous mapping from the latent space. This mapping can be adapted to "unwarp" the intermediate latent space so that the factors of variation become more linear, allowing a more realistic image to be generated based on the disentangled representation provided by the style vector in the intermediate latent space than if the image were generated based directly on the entangled representation provided by the latent code. For example, the relative disentanglement provided by the style vector allows a "style" (e.g., a high-level attribute, such as a pose or an identity of a person) of the high-resolution image to be effectively controlled and manipulated.

In some cases, image generation apparatus 115 generates an adaptive convolution filter based on the style vector. As used herein, a "convolution filter" (or convolution kernel, or kernel) refers to a convolution matrix or mask that does a convolution between the convolution filter and an image to blur, sharpen, emboss, detect edges, or otherwise manipulate pixels of the image. In some cases, when each pixel in an output image is a function of nearby pixels in an input image, the convolution filter is that function. As used herein, "adaptive" refers to the generated convolution filter's correspondence to a style associated with the style vector.

In some cases, image generation apparatus 115 generates the high-resolution image based on the style vector using the adaptive convolution filter. In some cases, image generation apparatus 115 provides the high-resolution image to user 105 via user device 110. An example of a high-resolution image generated by image generation apparatus 115 is described with reference to FIG. 3.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as the text prompt, the high-resolution image, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image generation apparatus 115 includes a computer implemented network. In some embodiments, the computer implemented network includes a machine learning model (such as the machine learning model described with reference to FIGS. 4-6 and 8-10). In some embodiments, image generation apparatus 115 also includes one or more processors, a memory subsystem, a communication interface, an I/O interface, one or more user interface components, and a bus as described with reference to FIG. 20. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Image generation apparatus 115 is an example of, or includes aspects of, the corresponding element described with reference to FIG. 4. Further detail regarding the architecture of image generation apparatus 115 is provided with reference to FIGS. 2-10 and 20. Further detail regarding a process for image generation is provided with reference to FIGS. 11-16. Further detail regarding a process for training the machine learning model is provided with reference to FIGS. 17-19.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, an image generation system (such as the image generation system described with reference to FIG. 1) generates a high-resolution image for a user. In some cases, the system first generates a low-resolution image (e.g., based on one or more prompts, such as a text prompt or an image prompt, provided by a user or retrieved from a database) using a diffusion model and then generates a high-resolution version of the low-resolution image using a generative adversarial network (GAN). In some cases, the GAN up-samples the low-resolution image using one or more convolution filters.

In some cases, the diffusion model, the GAN, or both are guided by the text prompt, the image prompt, or a combination thereof. In some cases, the GAN generates the high-resolution image based on the text input. For example, in some cases, the GAN generates a style vector based on the text input, and generates the high-resolution image based on the style vector.

At operation 205, a user provides a text prompt. In some cases, the operations of this step refer to, or may be performed by, a user as described with reference to FIG. 1. For example, in some cases, the text prompt describes the content of the high-resolution image to be generated (e.g., "a cute corgi lives in a house made out of sushi"). In some cases, the user provides the text prompt via a user interface displayed on a user device (such as the user device described with reference to FIG. 1) by an image generation apparatus (such as the image generation apparatus described with reference to FIGS. 1 and 4).

At operation 210, the system generates a low-resolution image based on the text prompt. In some cases, the operations of this step refer to, or may be performed by, an image generation apparatus as described with reference to FIGS. 1 and 4. For example, in some cases, the image generation apparatus generates a low-resolution image using a diffusion model as described with reference to FIG. 11.

At operation 215, the system generates a high-resolution image based on the low-resolution image. In some cases, the operations of this step refer to, or may be performed by, an image generation apparatus as described with reference to FIGS. 1 and 4. For example, in some cases, the image generation apparatus generates the high-resolution image using a generative adversarial network as described with reference to FIG. 11. In some cases, the image generation apparatus provides the high-resolution image to the user via the user interface.

FIG. 3 shows an example 300 of an image with increased resolution according to aspects of the present disclosure. The example shown includes low-resolution image 305, high-resolution image 310, and high-resolution image detail 315.

Low-resolution image 305 is an example of, or includes aspects of, the corresponding element described with reference to FIGS. 5, 9-10, and 12. High-resolution image 310 is an example of, or includes aspects of, the corresponding element described with reference to FIGS. 9 and 10.

Referring to FIG. 3, high-resolution image 310 and high-resolution image detail 315 include fine details and sharp textures compared to low-resolution image 305, such as the iris, presented in an artistic style. High-resolution image 310 includes or presents more information compared to low-resolution image 305.

In some cases, an image generation apparatus (such as the image generation apparatus described with reference to FIGS. 1 and 4) generates low-resolution image 305 based on a text prompt using a diffusion model, and generates high-resolution image 310 based on low-resolution image 305 and the text prompt.

Figure 4:
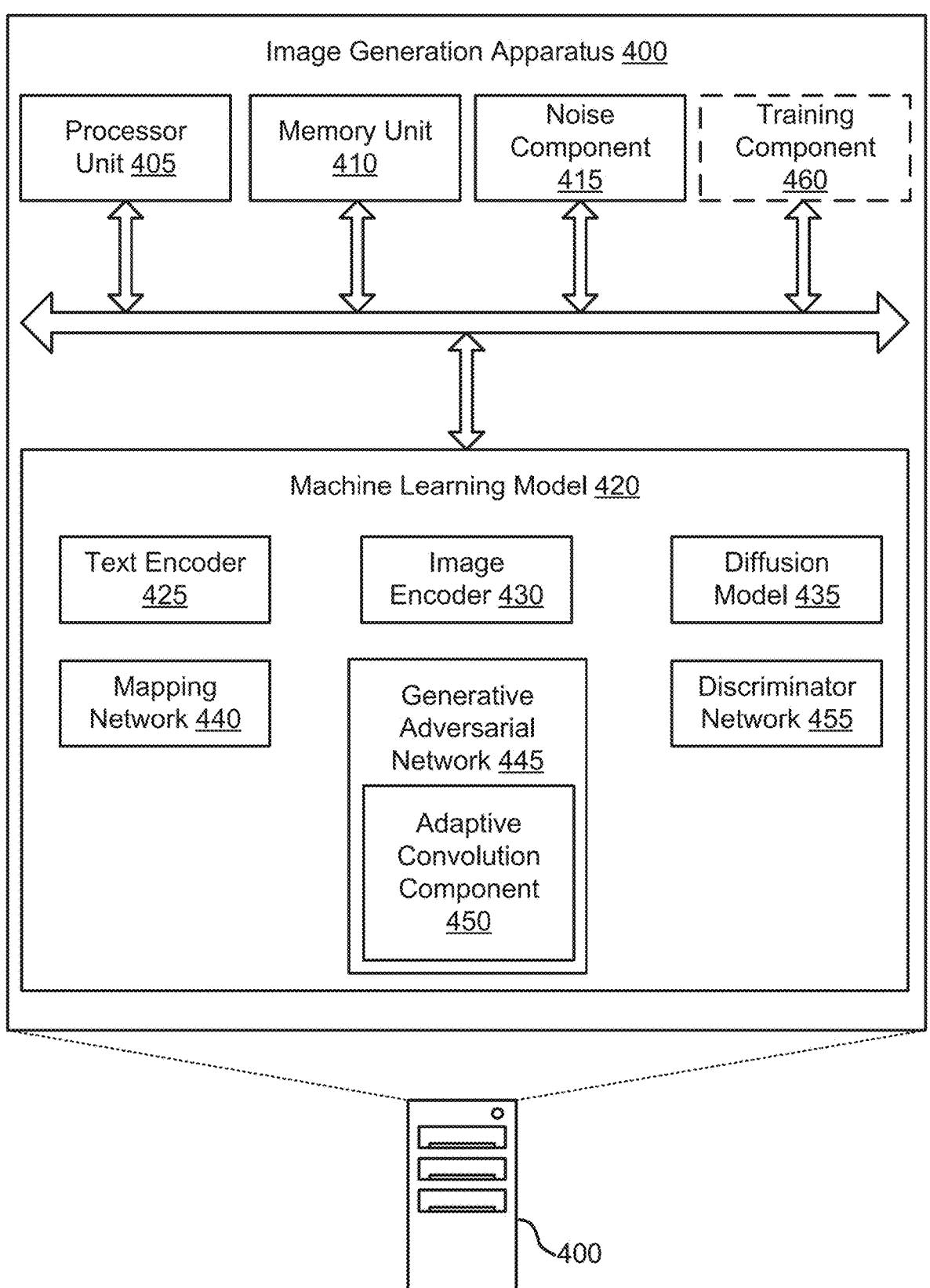
FIG. 4 shows an example of an image generation apparatus according to aspects of the present disclosure.

FIG. 4 shows an example of an image generation apparatus 400 according to aspects of the present disclosure. Image generation apparatus 400 is an example of, or includes aspects of, the corresponding element described with reference to FIG. 1. In one aspect, image generation apparatus 400 includes processor unit 405, memory unit 410, noise component 415, machine learning model 420, and training component 460.

Image generation apparatus 400 is an example of, or includes aspects of, the computing device described with reference to FIG. 20. For example, in some cases, noise component 415, machine learning model 420, training component 460, or a combination thereof are implemented as one or more hardware circuits that interact with components similar to the ones illustrated in FIG. 20 via a channel. For example, in some cases, noise component 415, machine learning model 420, training component 460, or a combination thereof are implemented as software stored in a memory subsystem and executed by one or more processors described with reference to FIG. 20.

Processor unit 405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 405 is configured to operate a memory array using a memory controller. In other cases, a memory controller is integrated into processor unit 405. In some cases, processor unit 405 is configured to execute computer-readable instructions stored in memory unit 410 to perform various functions. In some aspects, processor unit 405 includes special purpose components for modem processing, baseband processing, digital signal processing, or transmission processing. According to some aspects, processor unit 405 comprises the one or more processors described with reference to FIG. 20.

Memory unit 410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 405 to perform various functions described herein. In some cases, memory unit 410 includes a basic input/output system (BIOS) that controls basic hardware or software operations, such as an interaction with peripheral components or devices. In some cases, memory unit 410 includes a memory controller that operates memory cells of memory unit 410. For example, the memory controller may include a row decoder, column decoder, or both. In some cases, memory cells within memory unit 410 store information in the form of a logical state. According to some aspects, memory unit 410 comprises the memory subsystem described with reference to FIG. 20.

According to some aspects, noise component 415 adds first noise to an original image to obtain an input image including random noise (e.g., a noisy image). In some examples, noise component 415 generates a noise map based on the original image, where the low-resolution image is generated based on the noise map.

According to some aspects, noise component 415 is implemented as software stored in memory unit 410 and executable by processor unit 405, as firmware, as one or more hardware circuits, or as a combination thereof.

Machine learning model 420 is an example of, or includes aspects of, the corresponding element described with reference to FIGS. 5-6 and 8-10. In one aspect, machine learning model 420 includes text encoder 425, image encoder 430, diffusion model 435, mapping network 440, generative adversarial network (GAN) 445, and discriminator network 455. According to some aspects, machine learning model 420 is implemented as software stored in memory unit 410 and executable by processor unit 405, as firmware, as one or more hardware circuits, or as a combination thereof. According to some aspects, machine learning model 420 comprises machine learning parameters stored in memory unit 410.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a strength of connections between neurons and influence the neural network's ability to capture complex patterns in data.

According to some aspects, machine learning model 420 includes one or more ANNs. An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, text encoder 425 is an example of, or includes aspects of, the text encoder described with reference to FIGS. 5, 8-10, and 19. According to some aspects, text encoder 425 is implemented as software stored in memory unit 410 and executable by processor unit 405, as firmware, as one or more hardware circuits, or as a combination thereof. According to some aspects, text encoder 425 comprises text encoding parameters (e.g., machine learning parameters) stored in memory unit 410. According to some aspects, text encoder 425 is trained to generate a text embedding. In some cases, the high-resolution image is generated based on the text embedding.

According to some embodiments, text encoder 425 encodes a text description of a low-resolution image to obtain the text embedding. In some cases, text encoder 425 transforms the text embedding to obtain a global vector corresponding to the text description as a whole and a set of local vectors corresponding to individual tokens of the text description, where a style vector is generated based on the global vector and a high-resolution image is generated based on the set of local vectors. According to some embodiments, text encoder 425 encodes text describing the low-resolution training image to obtain a text embedding.

According to some aspects, text encoder 425 comprises one or more ANNs. For example, in some cases, text encoder 425 comprises a transformer, a Word2vec model, or a Contrastive Language-Image Pre-training (CLIP) model.

A transformer or transformer network is a type of ANN used for natural language processing tasks. A transformer network transforms one sequence into another sequence using an encoder and a decoder. The encoder and the decoder can include modules that can be stacked on top of each other multiple times. In some cases, the modules comprise multi-head attention and feed forward layers. In some cases, the encoder inputs (e.g., target sentences) are embedded as vectors in an n-dimensional space. In some cases, positional encoding of different words (for example, an assignment for every word/part of a sequence to a relative position) are added to the embedded representation (e.g., the n-dimensional vector) of each word.

In some examples, a transformer network includes an attention mechanism, in which an importance of parts of an input sequence are iteratively determined. In some cases, the attention mechanism involves a query, keys, and values denoted by Q, K, and V, respectively. In some cases, Q represents a matrix that contains the query (e.g., a vector representation of one word in the sequence), K represents the keys (e.g., vector representations of all the words in the sequence), and V represents the values, (e.g., the vector representations of all the words in the sequence). In some cases, for the multi-head attention modules of the encoder and the decoder, V comprises a same word sequence as Q. However, for an attention module that accounts for the sequences for the encoder and the decoder, V is different from a sequence represented by Q. In some cases, values in V are multiplied and summed with attention weights.

In some cases, a Word2vec model comprises a two-layer ANN trained to reconstruct a context of terms in a document. In some cases, the Word2vec model takes a corpus of documents as input and produces a vector space as output. In some cases, the resulting vector space may comprise hundreds of dimensions, with each term in the corpus assigned a corresponding vector in the space. The distance between the vectors may be compared by taking the cosine between two vectors. In some cases, word vectors that share a common context in the corpus are located close to each other in the vector space.

In some cases, a CLIP model is an ANN that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

According to some aspects, text encoder 425 is pre-trained. According to some aspects, text encoder 425 is implemented as a FLAN-XL encoder. According to some embodiments, text encoder 425 includes a pretrained encoder and a learned encoder. In some cases, the pretrained encoder is implemented as a CLIP model.

Image encoder 430 is an example of, or includes aspects of, the corresponding element described with reference to FIG. 5. According to some aspects, image encoder 430 is implemented as software stored in memory unit 410 and executable by processor unit 405, as firmware, as one or more hardware circuits, or as a combination thereof. According to some aspects, image encoder 430 comprises image encoding parameters (e.g., machine learning parameters) stored in memory unit 410. According to some aspects, image encoder 430 is trained to generate a high-resolution image based on the low-resolution image.

In some cases, the high-resolution image is generated based on the image embedding. According to some aspects, image encoder 430 includes one or more ANNs. According to some aspects, image encoder 430 is pre-trained. According to some aspects, image encoder 430 is implemented as a CLIP image encoder.

Diffusion model 435 is an example of, or includes aspects of, the corresponding elements described with reference to FIGS. 5-6 and 12. According to some aspects, diffusion model 435 is implemented as software stored in memory unit 410 and executable by processor unit 405, as firmware, as one or more hardware circuits, or as a combination thereof. According to some aspects, diffusion model 435 comprises diffusion parameters (e.g., machine learning parameters) stored in memory unit 410.

According to some aspects, diffusion model 435 is trained to generate a low-resolution image. In some cases, diffusion model 435 generates the low-resolution image based on a text prompt using a reverse diffusion process. In some aspects, diffusion model 435 takes the text embedding as input. In some aspects, diffusion model 435 takes the image embedding as input. In some aspects, the low-resolution image is generated using multiple iterations of diffusion model 435. In some aspects, at least one side of the low-resolution image includes 128 pixels. In some aspects, diffusion model 435 takes variable resolution inputs.

In some aspects, diffusion model 435 comprises a pixel diffusion model. In some aspects, diffusion model 435 comprises a latent diffusion model. In some aspects, diffusion model 435 comprises a U-Net (such as the U-Net described with reference to FIG. 6).

Mapping network 440 is an example of, or includes aspects of, the corresponding element described with reference to FIGS. 8-10. According to some aspects, mapping network 440 is implemented as software stored in memory unit 410 and executable by processor unit 405, as firmware, as one or more hardware circuits, or as a combination thereof. According to some aspects, mapping network 440 comprises mapping parameters (e.g., machine learning parameters) stored in memory unit 410.

According to some embodiments, mapping network 440 generates a style vector representing the text description of the low-resolution image. In some examples, mapping network 440 obtains a noise vector, where the style vector is based on the noise vector. According to some embodiments, mapping network 440 comprises mapping parameters stored in the at least one memory, wherein the mapping network is configured to generate a style vector representing a low-resolution image. According to some embodiments, mapping network 440 generates a predicted style vector representing the low-resolution training image.

In some cases, mapping network 440 includes a multi-layer perceptron (MLP). An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

Generative adversarial network (GAN) 445 is an example of, or includes aspects of, the corresponding element described with reference to FIGS. 8-10 and 19. According to some aspects, GAN 445 is implemented as software stored in memory unit 410 and executable by processor unit 405, as firmware, as one or more hardware circuits, or as a combination thereof. According to some aspects, GAN 445 comprises GAN parameters stored in memory unit 410. According to some aspects, GAN 445 is trained to generate a high-resolution image based on the low-resolution image.

In some cases, a GAN such as GAN 445 is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution). Therefore, given a training set, the GAN learns to generate new data with similar properties as the training set. A GAN may be trained via supervised learning, semi-supervised learning, unsupervised learning, and reinforcement learning.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Unsupervised learning is one of the three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

Semi-supervised machine learning is a type of machine learning approach that combines elements of both supervised and unsupervised learning. In traditional supervised learning, the algorithm is trained on a labeled dataset, where each example is paired with its corresponding target or output. In unsupervised learning, on the other hand, the algorithm is given unlabeled data and must find patterns or relationships on its own.

In semi-supervised learning, the algorithm is trained on a dataset that contains both labeled and unlabeled examples. The labeled examples provide explicit information about the correct output for the given inputs, while the unlabeled examples allow the algorithm to discover additional patterns or structures in the data. The motivation behind semi-supervised learning is often driven by the fact that obtaining labeled data can be expensive or time-consuming, while unlabeled data is often more readily available. By leveraging both types of data, semi-supervised learning aims to increase the performance of machine learning models, especially when labeled data is scarce.

Reinforcement learning is one of the three basic machine learning paradigms, alongside supervised learning and unsupervised learning. Specifically, reinforcement learning relates to how software agents make decisions in order to maximize a reward. The decision-making model may be referred to as a policy. Reinforcement learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

StyleGAN is an extension to a GAN architecture that uses an alternative generator network. In some cases, StyleGAN uses a mapping network (such as mapping network 440) to map points in latent space to an intermediate latent space, using an intermediate latent space to control style at each point, and introducing noise as a source of variation at each point in the generator network. In some examples, GAN 445 includes mapping network 440 and a synthesis network. In some cases, the synthesis network of GAN 445 includes an encoder and a decoder with a skip connection in a U-Net architecture. For example, a layer of the decoder is connected to a layer of the encoder by a skip connection in a U-Net architecture (such as the U-Net architecture described with reference to FIG. 6).

In some aspects, GAN 445 takes the text embedding as input. In some aspects, GAN 445 takes the image embedding as input. According to some embodiments, GAN 445 generates a predicted high-resolution image based on a low-resolution training image and a style vector.

In some aspects, diffusion model 435 contains more parameters than GAN 445. In some aspects, the low-resolution image is generated using multiple iterations of diffusion model 435 and the high-resolution image is generated using a single iteration of GAN 445. In some aspects, at least one side of the low-resolution image includes 128 pixels and at least one side of the high-resolution image includes 1024 pixels. In some aspects, an aspect ratio of the low-resolution image is different from 1:1 and the same as an aspect ratio of the high-resolution image. In some aspects, diffusion model 435 and GAN 445 take variable resolution inputs.

According to some embodiments, GAN 445 includes adaptive convolution component 450. According to some aspects, adaptive convolution component 450 is implemented as software stored in memory unit 410 and executable by processor unit 405, as firmware, as one or more hardware circuits, or as a combination thereof. According to some aspects, adaptive convolution component 450 comprises adaptive convolution parameters (e.g., machine learning parameters) stored in memory unit 410.

According to some aspects, adaptive convolution component 450 is trained to generate an adaptive convolution filter based on the style vector, where the high-resolution image is generated based on the adaptive convolution filter. According to some embodiments, adaptive convolution component 450 generates an adaptive convolution filter based on the style vector. In some examples, an adaptive convolution filter is a filter that can automatically adjust the filter's parameters based on the input data, in contrast to fixed convolution filters, which have a predetermined set of parameters that are applied uniformly to all input data.

In some examples, adaptive convolution component 450 identifies a set of predetermined convolution filters. In some cases, adaptive convolution component 450 combines the set of predetermined convolution filters based on the style vector to obtain the adaptive convolution filter. In some cases, a convolution filter (or convolution kernel, or kernel) refers to a convolution matrix or mask that performs a convolution on an image to blur, sharpen, emboss, detect edges, and perform other functions on pixels of the image. In some cases, the convolution filter represents a function of each pixel in an output image to nearby pixels in an input image.

In some cases, discriminator network 455 is an example of, or includes aspects of, the discriminator described with reference to FIG. 19. According to some aspects, discriminator network 455 is implemented as software stored in memory unit 410 and executable by processor unit 405, as firmware, as one or more hardware circuits, or as a combination thereof. According to some aspects, discriminator network 455 comprises discriminator parameters (e.g., machine learning parameters) stored in memory unit 410.

According to some embodiments, discriminator network 455 is configured to generate a discriminator image embedding and a conditioning embedding, wherein discriminator network 455 is trained together with GAN 445 using an adversarial training loss based on the discriminator image embedding and the conditioning embedding.

According to some embodiments, discriminator network 455 generates a discriminator image embedding based on the predicted high-resolution image. In some examples, discriminator network 455 generates a conditioning embedding based on the text embedding, where GAN 445 is trained based on the conditioning embedding.

According to some aspects, discriminator network 455 is implemented as a classification ANN. According to some aspects, discriminator network 455 comprises a GAN. According to some aspects, discriminator network 455 is implemented as a discriminator of GAN 445. In some cases, discriminator network 455 comprises a convolution branch configured to generate a discriminator image embedding based on an image. In some cases, discriminator network 455 comprises a conditioning branch configured to generate a conditioning embedding based on a conditioning vector.

Training component 460 is an example of, or includes aspects of, the corresponding element described with reference to FIG. 19. According to some aspects, training component 460 is implemented as software stored in memory unit 410 and executable by processor unit 405, as firmware, as one or more hardware circuits, or as a combination thereof.

According to some aspects, training component 460 is configured to update parameters of machine learning model 420, or a component of machine learning model 420. According to some aspects, training component 460 is configured to update parameters of text encoder 425. According to some aspects, training component 460 is configured to update parameters of diffusion model 435. According to some aspects, training component 460 is configured to update parameters of GAN 445. According to some aspects, training component 460 is configured to update parameters of discriminator network 455.

According to some aspects, training component 460 obtains a training dataset including a high-resolution training image and a low-resolution training image. In some cases, training component 460 trains GAN 445 based on a discriminator image embedding. In some examples, training component 460 computes a GAN loss based on the discriminator image embedding, where GAN 445 is trained based on the GAN loss. In some examples, training component 460 computes a perceptual loss based on the low-resolution training image and the predicted high-resolution image, where GAN 445 is trained based on the perceptual loss. In some examples, training component 460 adds noise to the low-resolution training image using forward diffusion to obtain an augmented low-resolution training image, where the predicted high-resolution image is generated based on the augmented low-resolution training image.

In some cases, training component 460 is omitted from image generation apparatus 400 and is included in a separate apparatus to perform the functions described herein. In some cases, image generation apparatus 400 communicates with the separate apparatus to perform the training processes described herein.

Figure 5:
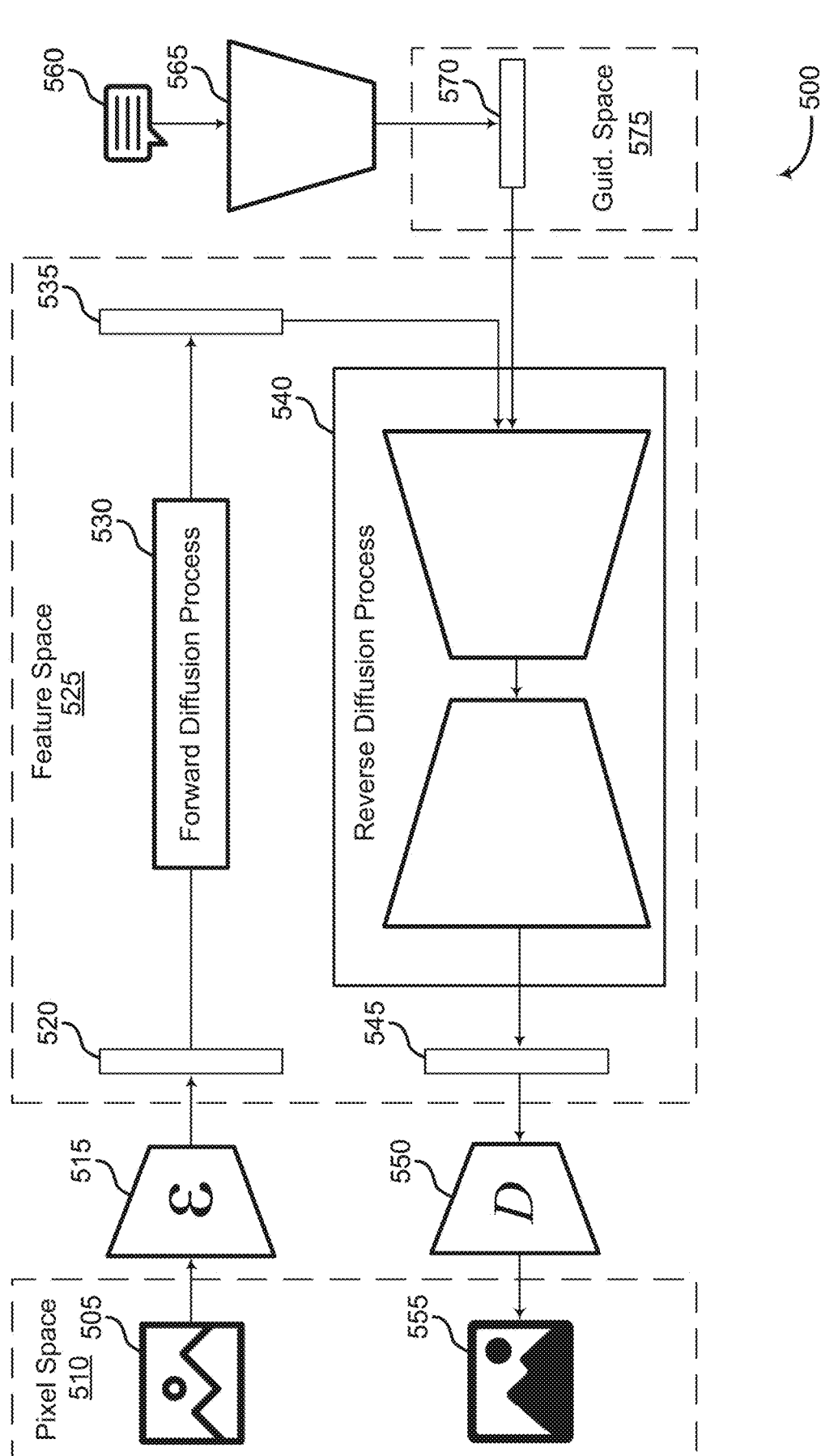
FIG. 5 shows an example of a guided latent diffusion architecture according to aspects of the present disclosure.

FIG. 5 shows an example of a guided latent diffusion architecture 500 according to aspects of the present disclosure. The example shown includes guided latent diffusion architecture 500, original image 505, pixel space 510, image encoder 515, original image features 520, feature space 525, forward diffusion process 530, noisy features 535, reverse diffusion process 540, denoised image features 545, image decoder 550, output image 555, text prompt 560, text encoder 565, guidance features 570, and guidance space 575.

Image encoder 515 is an example of, or includes aspects of, the corresponding element described with reference to FIG. 4. Forward diffusion process 530 is an example of, or includes aspects of, the corresponding element described with reference to FIG. 12. Reverse diffusion process 540 is an example of, or includes aspects of, the corresponding element described with reference to FIG. 12. Text prompt 560 is an example of, or includes aspects of, the corresponding element described with reference to FIGS. 8-10. Text encoder 565 is an example of, or includes aspects of, the corresponding element described with reference to FIGS. 4, 8-10, and 19.

Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 515 encodes original image 505 from pixel space 510 and generates original image features 520 in feature space 525. In some cases, original image 505 is a noisy image (e.g., a noise sample from a noise distribution). In some cases, original image 505 is an image prompt provided by a user via a user interface (such as the user and user interface described with reference to FIG. 1) or retrieved from a database (such as the database described with reference to FIG. 1). According to some aspects, image encoder 515 is included in an image generation apparatus as described with reference to FIG. 4. According to some aspects, image encoder 515 is included in a noise component as described with reference to FIG. 4.

According to some aspects, forward diffusion process 530 gradually adds noise to original image features 520 to obtain noisy features 535 (also in feature space 525) at various noise levels. In some cases, forward diffusion process 530 is implemented as the forward diffusion process described with reference to FIG. 12. In some cases, forward diffusion process 530 is implemented by a noise component described with reference to FIG. 4.

According to some aspects, reverse diffusion process 540 is applied to noisy features 535 to gradually remove the noise from noisy features 535 at the various noise levels to obtain denoised image features 545 in feature space 525. In some cases, denoised image features 545 are an example of, or include aspects of, the second noise described with reference to FIG. 10. In some cases, reverse diffusion process 540 is implemented as the reverse diffusion process described with reference to FIG. 12. In some cases, reverse diffusion process 540 is implemented by a diffusion model described with reference to FIG. 4.

In some cases, the diffusion model is a latent diffusion model. In some cases, reverse diffusion process 540 is implemented by a U-Net ANN described with reference to FIG. 6 included in the diffusion model.

According to some aspects, a training component (such as the training component described with reference to FIGS. 4 and 19) compares denoised image features 545 to original image features 520 at each of the various noise levels, and updates parameters of the diffusion model according to a mapping function F based on the comparison. In some cases, image decoder 550 decodes denoised image features 545 to obtain output image 555 (e.g., a low-resolution image) in pixel space 510. In some cases, an output image 555 is created at each of the various noise levels.

In some cases, the training component compares output image 555 to original image 505 to train the diffusion model as described with reference to FIG. 17. According to some aspects, image decoder 550 is included in an image generation apparatus as described with reference to FIG. 5. According to some aspects, image decoder 550 is included in a diffusion model as described with reference to FIG. 4. In some cases, output image 555 is an example of, or includes aspects of, a low-resolution image as described with reference to FIGS. 3, 9-10, and 12.

In some cases, image encoder 515 and image decoder 550 are pretrained prior to training the diffusion model. In some examples, image encoder 515, image decoder 550, and the diffusion model are jointly trained. In some cases, image encoder 515 and image decoder 550 are jointly fine-tuned with the diffusion model.

According to some aspects, reverse diffusion process 540 is also guided based on a guidance prompt such as text prompt 560 (e.g., a text prompt as described with reference to FIGS. 1-2 and 8-10), an image prompt (such as the image prompt provided by the user or retrieved from the database), a mask, a layout, a segmentation map, etc. In some cases, text prompt 560 is encoded using text encoder 565 (e.g., a multimodal encoder) or an encoder that corresponds to the modality of the guidance prompt to obtain guidance features 570 in guidance space 575. For example, in some cases, the guidance prompt is an image prompt, and image encoder 515 is implemented to encode the image prompt to obtain guidance features 570.

In some cases, guidance features 570 are combined with noisy features 535 at one or more layers of reverse diffusion process 540 to ensure that output image 555 includes content described by text prompt 560. For example, guidance features 570 can be combined with noisy features 535 using a cross-attention block within reverse diffusion process 540.

Cross-attention, also known as multi-head attention, is an extension of the attention mechanism used in some ANNs for NLP tasks. In some cases, cross-attention enables reverse diffusion process 540 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing reverse diffusion process 540 to better understand the context and generate more accurate and contextually relevant outputs.

Although FIG. 5 illustrates a latent diffusion architecture, according to aspects of the present disclosure, the diffusion architecture may also be implemented in pixel space, in which an input image is noised and denoised in a pixel space rather than a feature space to obtain an output as described above.

Figure 6:
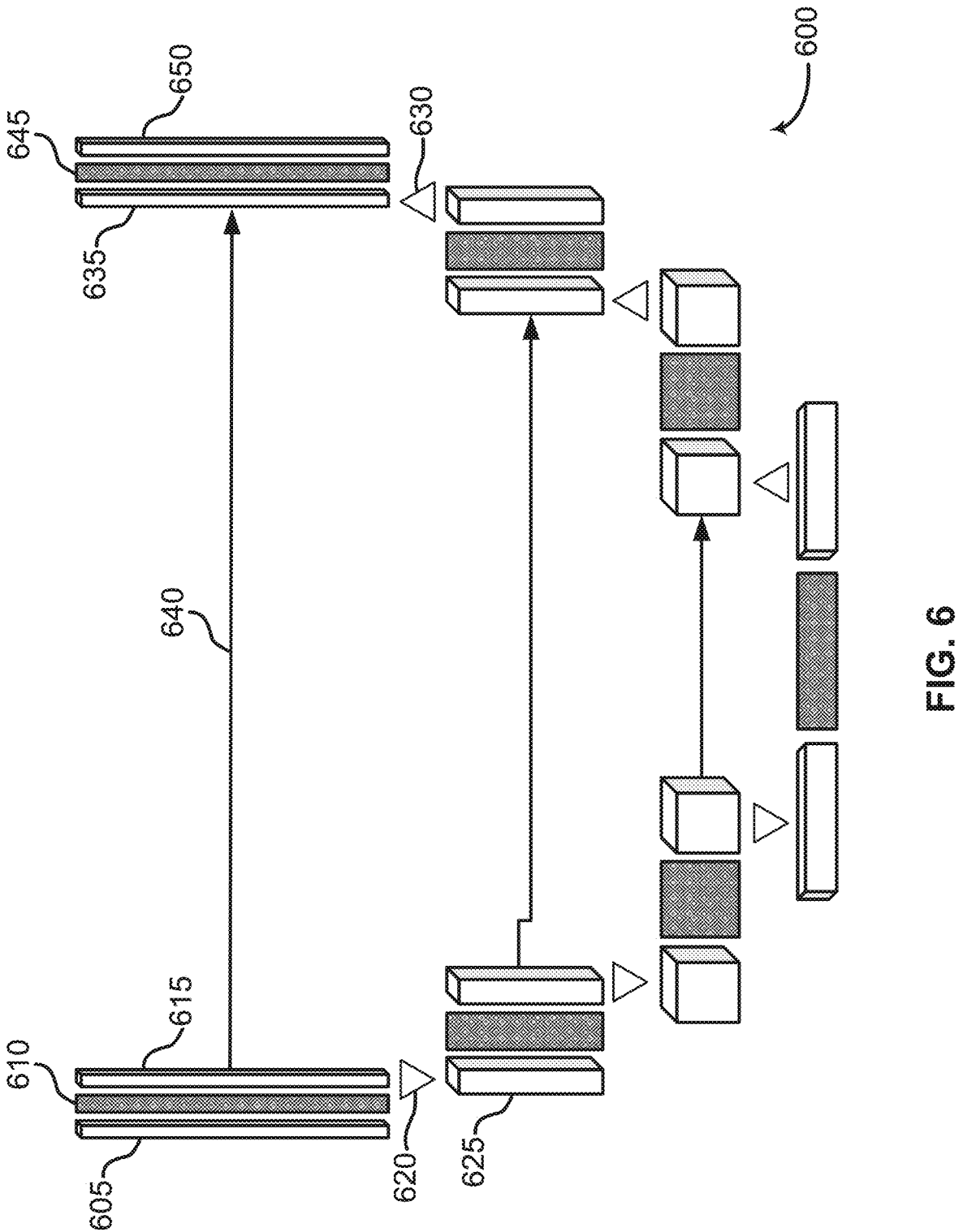
FIG. 6 shows an example of a U-Net according to aspects of the present disclosure.

FIG. 6 shows an example of a U-Net 600 according to aspects of the present disclosure. The example shown includes U-Net 600, input features 605, initial neural network layer 610, intermediate features 615, down-sampling layer 620, down-sampled features 625, up-sampling process 630, up-sampled features 635, skip connection 640, final neural network layer 645, and output features 650.

According to some aspects, a diffusion model (such as the diffusion model described with reference to FIGS. 4-5) is based on an ANN architecture known as a U-Net. According to some aspects, U-Net 600 receives input features 605, where input features 605 include an initial resolution and an initial number of channels, and processes input features 605 using an initial neural network layer 610 (e.g., a convolutional network layer) to produce intermediate features 615.

In some cases, intermediate features 615 are then down-sampled using a down-sampling layer 620 such that down-sampled features 625 have a resolution less than the initial resolution and a number of channels greater than the initial number of channels.

In some cases, this process is repeated multiple times, and then the process is reversed. For example, down-sampled features 625 are up-sampled using up-sampling process 630 to obtain up-sampled features 635. In some cases, up-sampled features 635 are combined with intermediate features 615 having a same resolution and number of channels via skip connection 640. In some cases, the combination of intermediate features 615 and up-sampled features 635 are processed using final neural network layer 645 to produce output features 650. In some cases, output features 650 have the same resolution as the initial resolution and the same number of channels as the initial number of channels.

According to some aspects, U-Net 600 receives additional input features to produce a conditionally generated output. In some cases, the additional input features include a vector representation of an input prompt. In some cases, the additional input features are combined with intermediate features 615 within U-Net 600 at one or more layers. For example, in some cases, a cross-attention module is used to combine the additional input features and intermediate features 615.

U-Net 600 is an example of, or includes aspects of, a U-Net included in the diffusion model described with reference to FIGS. 4-5. In some cases, U-Net 600 implements the reverse diffusion process described with reference to FIG. 12.

Figure 7:
FIG. 7 shows an example of a comparative machine learning model.

FIG. 7 shows an example 700 of a comparative machine learning model. The example shown includes the comparative machine learning model, latent space 740, intermediate latent space 745, learned affine transformation 750, constant 755, noise 760, and learned per-channel scaling factor 765. The comparative machine learning model includes comparative mapping network 705 and synthesis network 715. Comparative mapping network 705 includes fully connected layers 710. Synthesis network 715 includes style block 720. Style block 720 includes modulation layer 725, convolution layer 730, and normalization layer 735.

Referring to FIG. 7, the comparative machine learning model is implemented as a style-based GAN (such as StyleGAN or a variation of StyleGAN) in which comparative mapping network 705 maps a sampled latent vector from latent space 740 to a style vector in intermediate latent space 745 via fully connected layers 710 and synthesis network 715 generates an image based on the style vector and a constant 755 (in some cases, a learned constant). Intermediate latent space 745 provides greater disentanglement than latent space 740, which allows automatic, unsupervised separation of high-level attributes (e.g., pose and identity) from stochastic variation (e.g., freckles, hair) in the generated image, and provides for intuitive scale-specific mixing and interpolation operations.

Synthesis network 715 comprises a series of up-sampling convolution layers modulated by the style vector. In the comparative machine learning model, convolution is a main process used for generating all output pixels for the image, with the style vector as the only source of information to model conditioning.

In the implementation shown, synthesis network 715 comprises one or more style blocks, including style block 720, where a corresponding style is respectively active at each style block. Synthesis network 715 includes modulation layers (such as modulation layer 725), convolution layers (such as convolution layer 730), and normalization layers (such as normalization layer 735).

In the example shown, constant 755 (e.g., a 4×4×512 constant) is input to style block 720, and the output from style block 720 is combined with a bias b and noise 760 via learned per-channel scaling factor 765 to introduce variation and then passed to successive style blocks. At each style block, the style vector is received as a transformed input via learned affine transformation 750 to modulate constant 755. In some cases, the second style block includes an up-sampling layer.

In some implementations of a style-based GAN, the style vector is transformed by learned affine transformation 750 and is incorporated into each block of synthesis network 715 following the convolution layers via adaptive instance normalization (AdaIN) layers. In this case, synthesis network 715 applies bias and noise within the style block, rather than following the style block, causing the relative impact of the bias and noise to be inversely proportional to the current style's magnitudes.

The AdaIN layers may first standardize the output of constant 755 so that latent space 740 maps to features such that a randomly selected constant will result in features that are distributed with a Gaussian distribution, and then add the style vector as a bias term, thereby choosing a random latent variable such that the resulting output will not bunch up. In some cases, the output of each convolution layer in synthesis network 715 is a block of activation maps. In some cases, the up-sampling layer doubles the dimensions of input (e.g., from 4×4 to 8×8) and is followed by another convolution layer or convolution layers.

In the example shown, more predictable results can be obtained by moving bias and noise operations outside of the style blocks, where they can operate on normalized data. In some cases, synthesis network 715 enables normalization and modulation to operate on the standard deviation alone, as the mean is not needed. The application of bias, noise, and normalization to constant 755 can also be removed.

In the example shown, an activation function (e.g., leaky ReLU) is applied right after adding the bias b. In some cases, the bias b is added outside an active area of a style, and only the standard deviation is adjusted per feature map. In some cases, an AdaIN operation is replaced with a "demodulation" operation, which is applied to the weights W associated with each convolution layer.

In the example shown, in each style block, modulation is followed by a convolution and then normalization. The modulation scales each input feature map of the convolution based on the incoming style, which can alternatively be implemented by scaling the convolution weights W.

In the example shown, Gaussian noise is added to each activation map of synthesis network 715. A different noise sample may be generated for each style block and interpreted using a learned per-channel scaling factor. The Gaussian noise may introduce style-level variation at a given level of detail.

Figure 8:
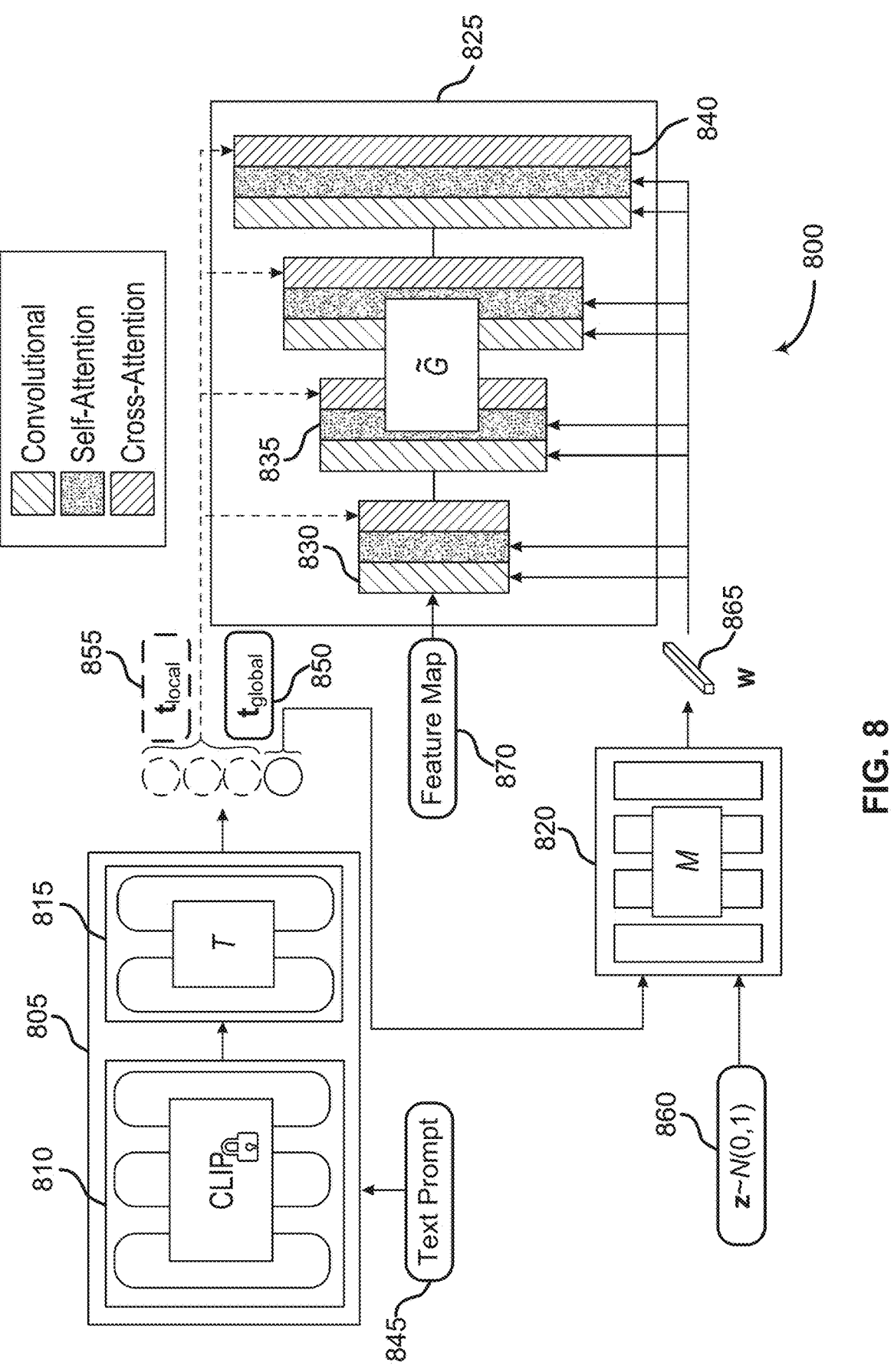
FIG. 8 shows an example of a machine learning model according to aspects of the present disclosure.

FIG. 8 shows an example of a machine learning model 800 according to aspects of the present disclosure. The example shown includes machine learning model 800, text prompt 845, global vector 850, local vectors 855, latent code 860, style vector 865, and feature map 870.

Machine learning model 800 is an example of, or includes aspects of, the corresponding element described with reference to FIGS. 4, 9, and 10. In one aspect, machine learning model 800 includes text encoder 805, mapping network 820, and generative adversarial network (GAN) 825. Text encoder 805 is an example of, or includes aspects of, the corresponding element described with reference to FIGS. 4, 5, 9-10, and 19.

In one aspect, text encoder 805 includes pretrained encoder 810 and learned encoder 815. Pretrained encoder 810 is an example of, or includes aspects of, the corresponding element described with reference to FIGS. 9 and 10. Learned encoder 815 is an example of, or includes aspects of, the corresponding element described with reference to FIGS. 9 and 10. Mapping network 820 is an example of, or includes aspects of, the corresponding element described with reference to FIGS. 4, 9, and 10.

GAN 825 is an example of, or includes aspects of, the corresponding element described with reference to FIGS. 4, 9, 10, and 19. In one aspect, GAN 825 includes convolution block 830, self-attention block 835, and cross-attention block 840. Convolution block 830 is an example of, or includes aspects of, the corresponding element described with reference to FIG. 9. Self-attention block 835 is an example of, or includes aspects of, the corresponding element described with reference to FIG. 9. Cross-attention block 840 is an example of, or includes aspects of, the corresponding element described with reference to FIG. 9.

Referring to FIG. 8, according to some aspects, pretrained encoder 810 (such as a CLIP encoder) of text encoder 805 receives text prompt 845 and generates a conditioning vector in response as described with reference to FIG. 15. In some cases, pretrained encoder 810 provides the conditioning vector to learned encoder 815 as described with reference to FIG. 15. In some cases, the conditioning vector is the text embedding described with reference to FIG. 5. In some cases, learned encoder 815 generates a text embedding based on the conditioning vector. In some cases, the text embedding is the text embedding described with reference to FIG. 5. In some cases, learned encoder 815 transforms the text embedding to obtain global vector 850 and local vectors 855 as described with reference to FIG. 1. In some cases, text encoder 805 provides global vector 850 to mapping network 820.

Text prompt 845 is an example of, or includes aspects of, the corresponding element described with reference to FIGS. 5, 9, and 10. Global vector 850 is an example of, or includes aspects of, the corresponding element described with reference to FIGS. 9 and 10. Local vectors 855 are an example of, or includes aspects of, the corresponding element described with reference to FIGS. 9 and 10.

In some cases, mapping network 820 is an example of, or includes aspects of, the comparative mapping network described with reference to FIG. 7. For example, in some cases, mapping network 820 includes multiple fully connected layers. However, in some cases, mapping network 820 generates a style vector based on a text input, whereas the comparative mapping network does not. For example, in some cases, mapping network 820 samples latent code 860 from a normal distribution in a latent space (e.g., a latent code $z \sim N(0,1)$) and obtains style vector 865 in an intermediate latent space based on global vector 850 and latent code 860 as described with reference to FIG. 15.

Latent code 860 is an example of, or includes aspects of, the corresponding element described with reference to FIGS. 9 and 10. Style vector 865 is an example of, or includes aspects of, the corresponding element described with reference to FIGS. 9, 10, and 14.

In some cases, GAN 825 is an example of, or includes aspects of, the synthesis network described with reference to FIG. 7. For example, in some cases, GAN 825 maps a style vector and a feature map input (e.g., the constant described with reference to FIG. 7) using convolution blocks to obtain an image. For example, in some cases, each convolution block (e.g., convolution block 830) can be included in a style block as described with reference to FIG. 7. In some cases, GAN 825 adds noise, bias, or a combination thereof between outputs to introduce variation as described with reference to FIG. 7. However, in some cases, GAN 825 performs an adaptive convolution filter process to increase the convolution capacity of GAN 825, allowing a higher-quality images to be generated. The adaptive convolution filter process is not performed by the synthesis network of FIG. 7.

Additionally, in some cases, GAN 825 includes a self-attention block comprising one or more self-attention layers (such as self-attention block 835), a cross-attention block comprising one or more cross-attention layers (such as cross-attention block 840), or a combination thereof to further increase the capacity of GAN 825. The cross-attention block and the self-attention block are not included in the synthesis network of FIG. 7.

In some cases, a self-attention block and a cross-attention block is respectively added to each style block as described with reference to FIG. 7. Accordingly, in some cases, the increased convolution capacity of GAN 825 allows GAN 825 to generate a higher-quality image than the synthesis network of FIG. 7 is capable of producing, while retaining a high processing speed that is characteristic of the synthesis network of FIG. 7.

In some cases, the convolution blocks of GAN 825 comprise a series of up-sampling convolution layers, similar to the synthesis network of FIG. 7. In some cases, each convolution layer is enhanced with an adaptive convolution filter $$g^f_{adaconv}$$

described with reference to FIGS. 11 and 13-14 followed by a cross-attention layer $$g^f_{cross\text{-}attention}$$

and a self-attention layer $$g_{attention}^{\ell}:$$

$$f_{\ell+1} = g_{cross-attention}^{\ell}\left(g_{attention}^{\ell}\left(g_{adaconv}^{\ell}(f_{\ell+1}, w), w\right), t_{local}\right) \qquad (1)$$

In some cases, f is a feature, w is a style vector, and $t_{local}$ is a local vector as described with reference to FIG. 15. In some cases, a depth of GAN 825 is increased by adding more blocks at each layer of GAN 825. In some cases, GAN 825 reduces a dimensionality of latent code 860 to 128 and does not use style mixing and path length regularizers, thereby increasing performance in multi-category generation.

In some cases, mapping network 820 provides style vector 865 to one or more convolution layers (e.g., a convolution layer included in convolution block 830) and to one or more self-attention layers (e.g., a self-attention layer included in self-attention block 835) of GAN 825 for processing as described with reference to FIG. 15. Meanwhile, in some cases, text encoder 805 provides local vectors 855 to one or more cross-attention layers (e.g., a cross-attention layer included in cross-attention block 840) for processing as described with reference to FIG. 15.

Accordingly, in some cases, as described with reference to FIG. 15, GAN 825 generates a text-conditioned image by modulating convolutions of feature map 870 using style vector 865, where the content described by the text prompt is passed to GAN 825 via a combination of style vector 865 and local vectors 855, a long-range dependence between feature map 870 and style vector 865 is captured by the self-attention blocks, and a visual alignment between text prompt 845 and the image is increased by attending to local vectors 855 in the self-attention blocks.

In some cases, GAN 825 is an example of, or includes aspects of, the synthesis network described with reference to FIG. 7. In some cases, some architectural details of the comparative machine learning model described with reference to FIG. 7 are matched, such as an equalized learning rate and weight initialization from a unit normal distribution.

Figure 9:
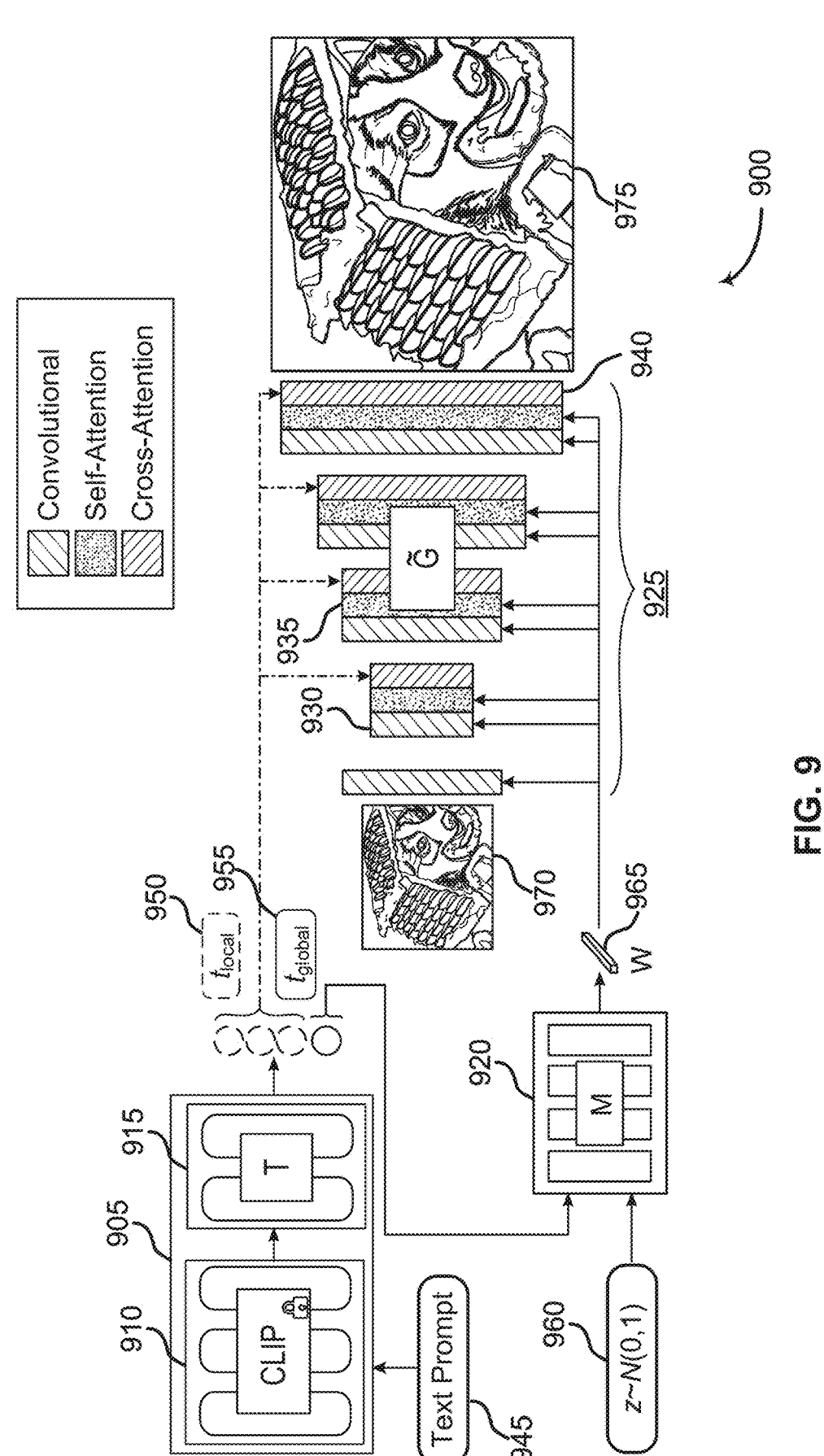
FIG. 9 shows an example of a machine learning model with a low-resolution image input according to aspects of the present disclosure.

FIG. 9 shows an example of a machine learning model with a low-resolution image input according to aspects of the present disclosure. The example shown includes machine learning model 900, text prompt 945, local vectors 950, global vector 955, latent code 960, style vector 965, low-resolution image 970, and high-resolution image 975.

Machine learning model 900 is an example of, or includes aspects of, the corresponding element described with reference to FIGS. 4, 8, and 10. In one aspect, machine learning model 900 includes text encoder 905, mapping network 920, and generative adversarial network (GAN) 925. Text encoder 905 is an example of, or includes aspects of, the corresponding element described with reference to FIGS. 4, 5, 8, 10, and 19.

In one aspect, text encoder 905 includes pretrained encoder 910 and learned encoder 915. Pretrained encoder 910 is an example of, or includes aspects of, the corresponding element described with reference to FIG. 8. Learned encoder 915 is an example of, or includes aspects of, the corresponding element described with reference to FIG. 8. Mapping network 920 is an example of, or includes aspects of, the corresponding element described with reference to FIGS. 4, 8, and 10. GAN 925 is an example of, or includes aspects of, the corresponding element described with reference to FIGS. 4, 8, 10, and 19.

In one aspect, GAN 925 includes convolution block 930, self-attention block 935, and cross-attention block 940. Convolution block 930 is an example of, or includes aspects of, the corresponding element described with reference to FIG. 8. Self-attention block 935 is an example of, or includes aspects of, the corresponding element described with reference to FIG. 8. Cross-attention block 940 is an example of, or includes aspects of, the corresponding element described with reference to FIG. 8.

Text prompt 945 is an example of, or includes aspects of, the corresponding element described with reference to FIGS. 5, 8, and 10. Local vectors 950 are an example of, or includes aspects of, the corresponding element described with reference to FIGS. 8 and 10. Global vector 955 is an example of, or includes aspects of, the corresponding element described with reference to FIGS. 8 and 10. Latent code 960 is an example of, or includes aspects of, the corresponding element described with reference to FIGS. 8 and 10. Style vector 965 is an example of, or includes aspects of, the corresponding element described with reference to FIGS. 8, 10, and 14.

Low-resolution image 970 is an example of, or includes aspects of, the corresponding element described with reference to FIGS. 3, 5, 10, and 12. High-resolution image 975 is an example of, or includes aspects of, the corresponding element described with reference to FIGS. 3 and 10.

Referring to FIG. 9, according to some aspects, GAN 925 performs large factors of up-sampling by leveraging a text description. For example, according to some aspects, GAN 925 applies one or more down-sampling layers followed by up-sampling layers. In some cases, GAN 925 includes a series of up-sampling convolution layers, where convolution block 930 is enhanced with a sample-adaptive kernel selection as described with reference to FIGS. 13-14, followed by attention layers. Thus, GAN 925 takes low-resolution image 970 (such as the image output by the diffusion model as described with reference to FIGS. 5 and 12) as input and generates high-resolution image 975 in response.

For example, in some cases, GAN 925 generates a feature map (such as the feature map described with reference to FIG. 8) based on low-resolution image 970 (or an image embedding corresponding to low-resolution image 970) and performs a convolution process on the feature map to obtain high-resolution image 975. In some cases, high-resolution image 975 corresponds to text prompt 945.

Figure 10:
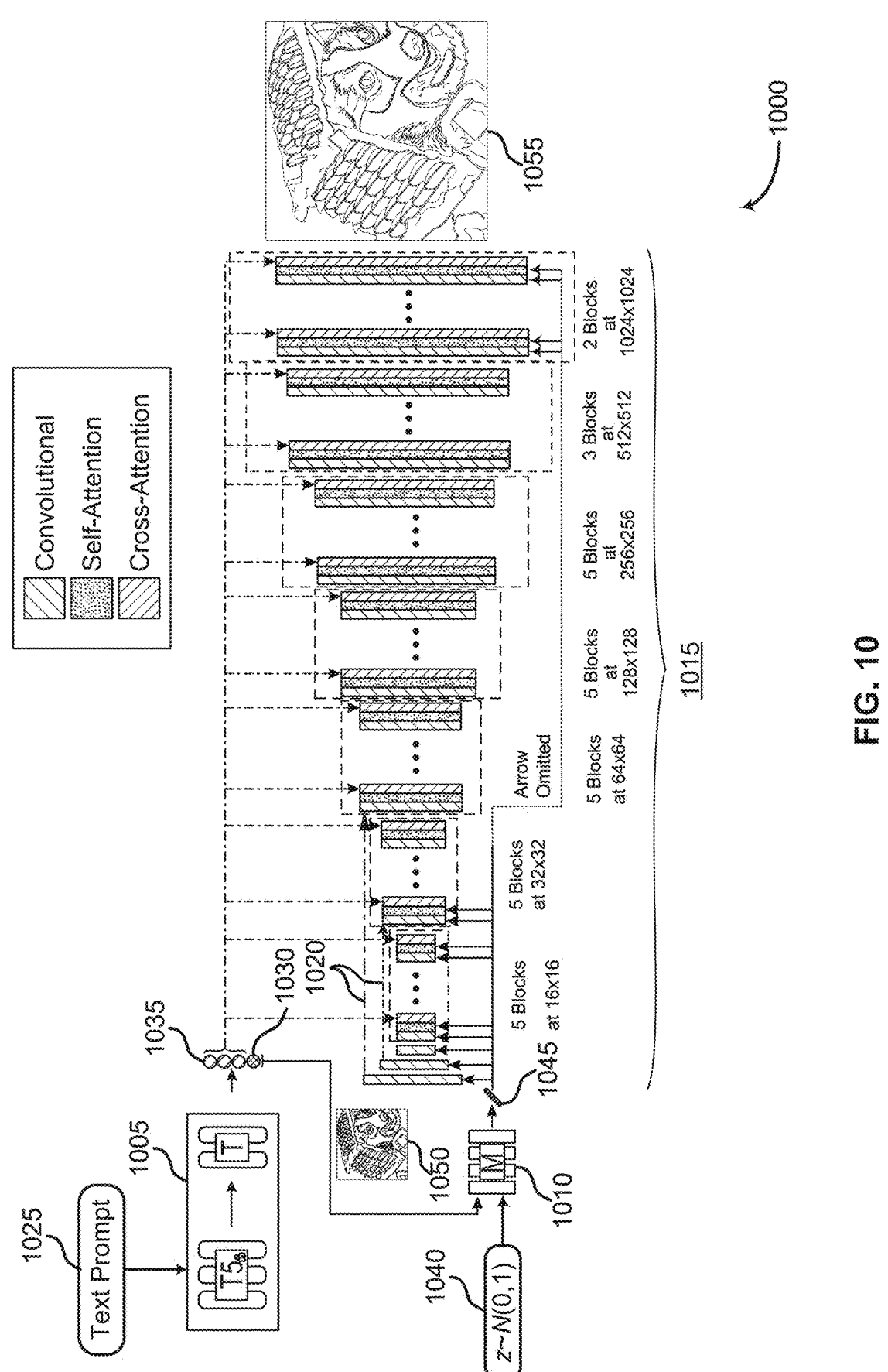
FIG. 10 shows a detail view of a machine learning model for high-resolution image generation according to aspects of the present disclosure.

FIG. 10 shows a detail view of a machine learning model according to aspects of the present disclosure. The example shown includes machine learning model 1000, text prompt 1025, global vector 1030, local vectors 1035, latent code 1040, style vector 1045, low-resolution image 1050, and high-resolution image 1055.

Machine learning model 1000 is an example of, or includes aspects of, the corresponding element described with reference to FIGS. 4, 8, and 9. In one aspect, machine learning model 1000 includes text encoder 1005, mapping network 1010, and generative adversarial network (GAN) 1015. Text encoder 1005 is an example of, or includes aspects of, the corresponding element described with reference to FIGS. 4, 5, 8, 9, and 19. Mapping network 1010 is an example of, or includes aspects of, the corresponding element described with reference to FIGS. 4, 8, and 9. GAN 1015 is an example of, or includes aspects of, the corresponding element described with reference to FIGS. 4, 8, and 9. In one aspect, GAN 1015 includes skip connections 1020.

Text prompt 1025 is an example of, or includes aspects of, the corresponding element described with reference to FIGS. 5, 8, and 9. Global vector 1030 is an example of, or includes aspects of, the corresponding element described with reference to FIGS. 8 and 9. Local vectors 1035 are an example of, or includes aspects of, the corresponding element described with reference to FIGS. 8 and 9. Latent code 1040 is an example of, or includes aspects of, the corresponding element described with reference to FIGS. 8 and 9. Style vector 1045 is an example of, or includes aspects of, the corresponding element described with reference to FIGS. 8, 9, and 14. Low-resolution image 1050 is an example of, or includes aspects of, the corresponding element described with reference to FIGS. 3, 5, 9, and 12. High-resolution image 1055 is an example of, or includes aspects of, the corresponding element described with reference to FIGS. 3 and 9.

According to some embodiments, GAN 1015 is implemented as an asymmetric U-Net architecture, where low-resolution image 1050 (or a feature map or an image embedding corresponding to low-resolution image 1050) passes through multiple (e.g., three) down-sampling residual blocks and then multiple (e.g., six) up-sampling residual blocks with attention layers to generate high-resolution image 1055. In some cases, the depth of GAN 1015 is increased by adding more blocks at each layer. As shown in FIG. 10, a layer at 16×16 pixels includes five blocks of interleaved attention and convolution layers, a layer at 32×32 pixels includes five blocks of interleaved attention and convolution layers, layers at 64×64 pixels, 128×128 pixels, and 256×256 pixels each include five blocks of interleaved attention and convolution layers, a layer at 512×512 pixel includes three blocks of interleaved attention and convolution layers, and a layer at 1024×1024 pixels includes two blocks of interleaved attention and convolution layers. According to some aspects, low-resolution image 1050 comprises a 128×128 pixel resolution, and layers corresponding to 16×16, 32×32, and 64×64 pixel resolutions are omitted.

According to an embodiment, GAN 1015 includes skip connection(s) 1020. In some cases, skip connections 1020 are disposed in the asymmetric U-Net architecture between layers at a same resolution. For example, in some cases, GAN 1015 includes down-sampling residual blocks and then up-sampling residual blocks, where a layer of the down-sampling residual blocks is connected to a layer of the up-sampling residual blocks by a skip connection 1020 in the asymmetric U-Net architecture.

In some cases, GAN 1015 takes style vector 1045 and low-resolution image 1050 as input and applies a down-sampling process followed by an up-sampling process to generate high-resolution image 1055. In some cases, GAN 1015 includes multiple (e.g., three) down-sampling layers and multiple (e.g., seven) up-sampling layers/units (e.g., from 16×16 or 128×128 to 1024×1024). In some cases, one or more down-sampling layers are connected to a following up-sampling layer via a skip connection 1020. For example, in some cases, a first down-sampling layer is connected by a skip connection 1020 to a second up-sampling layer.

In some cases, local vectors 1035 are input to each cross-attention layer in a processing block at successively higher resolutions. For example, in some cases, local vectors 1035 are input to each of the blocks at a first resolution, to each of the blocks at a higher resolution, and so on. In some cases, style vector 1045 is input to each convolution layer and each cross-attention layer at the successively higher resolutions. For example, style vector 1045 is input to each of the blocks at the first resolution, to each of the blocks at the higher resolution, and so on.

In some cases, high-resolution image 1055 comprises a higher resolution than 1024×1024 pixels. For example, to generate a 3072×3072 pixel image, a low-resolution (e.g., 128×128 pixel) input image is up-sampled (via super-resolution) to a 1024×1024 pixel resolution by applying the model once with an upscaling factor of 8×, the 1024×1024 pixel output is resized to a 384×384 pixel resolution using bicubic resampling, and the 384×384 pixel output is up-sampled to produce the 3072×3072 (i.e., 3072=384× 8) pixel resolution output image.

In bicubic resampling, a cubic polynomial function is used to compute pixel values in a resized image based on values of neighboring pixels in an original image. The interpolation is performed independently in both horizontal and vertical directions. Bicubic interpolation takes into account neighboring pixels arranged in a grid and computes an interpolated value as a weighted sum of the neighboring pixels, where the weights are determined by a cubic polynomial. Bicubic interpolation generally produces smoother and more accurate results over simpler methods, such as bilinear interpolation, especially when scaling images to larger sizes. Bicubic resampling helps reduce artifacts and preserves more details during the resizing process.

Image Generation

A method for image generation is described with reference to FIGS. 11-16. One or more aspects of the method include obtaining an input image having a first resolution, wherein the input image includes random noise; generating, using a diffusion model, a low-resolution image based on the input image, wherein the low-resolution image has the first resolution; and generating, using a generative adversarial network (GAN), a high-resolution image based on the low-resolution image, wherein the high-resolution image has a second resolution that is greater than the first resolution.

Some examples of the method further include generating a text embedding using a text encoder, wherein the high-resolution image is generated based on the text embedding. In some aspects, the diffusion model and the GAN each take the text embedding as input.

Some examples of the method further include generating an image embedding using an image encoder, wherein the high-resolution image is generated based on the image embedding. In some aspects, the diffusion model and the GAN each take the image embedding as input.

In some aspects, the diffusion model contains more parameters than the GAN. In some aspects, the low-resolution image is generated using multiple iterations of the diffusion model and the high-resolution image is generated using a single iteration of the GAN.

In some aspects, at least one side of the low-resolution image comprises 128 pixels and at least one side of the high-resolution image comprises 1024 pixels. In some aspects, an aspect ratio of the low-resolution image is different from 1:1 and the same as an aspect ratio of the high-resolution image. In some aspects, the diffusion model and the GAN take variable resolution inputs.

FIG. 11 shows an example of a method 1100 for generating an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, according to some aspects, an image generation system (such as the image generation system described with reference to FIG. 1) generates a high-resolution image based on a low-resolution image. In some cases, the image generation system generates the low-resolution image based on a prompt (such as a text prompt or an image prompt). In some cases, the image generation system generates the low-resolution image based on multiple prompts (for example, a text prompt and an image prompt). In some cases, the prompt or multiple prompts are provided by a user via a user interface displayed on a user device by the image generation system (such as the user, user device, and user interface described with reference to FIG. 1).

In some cases, the image generation system uses the text prompt, the image prompt, or a combination thereof as a guidance prompt for a diffusion model (such as the diffusion model described with reference to FIGS. 4-6) configured to generate the low-resolution image, a generative adversarial network (such as the GAN described with reference to FIGS. 4 and 8-10) configured to generate the high-resolution image, or a combination thereof.

In some cases, by using the diffusion model to generate the low-resolution image, the image generation system leverages image quality characteristics of the diffusion model to create a high-quality image. In some cases, by using the GAN to generate the high-quality image based on the low-resolution image, the image generation system leverages processing speed characteristics of the GAN to provide a high-quality, high-resolution image at a faster processing speed than conventional image generation systems.

At operation 1105, the system obtains an input image having a first resolution, where the input image includes random noise. In some cases, the operations of this step refer to, or may be performed by, a noise component as described with reference to FIG. 4. In some cases, the noise component generates the input image having the first resolution (e.g., a noisy image) using a forward diffusion process (such as the forward diffusion process described with reference to FIGS. 5 and 12).

At operation 1110, the system generates a low-resolution image based on the input image, where the low-resolution image has the first resolution. In some cases, the operations of this step refer to, or may be performed by, a diffusion model as described with reference to FIG. 4.

For example, in some cases, the user provides a text prompt, an image prompt, or a combination thereof to an image generation apparatus (such as the image generation apparatus described with reference to FIGS. 1 and 4). In some cases, the image generation apparatus retrieves the text prompt, the image prompt, or a combination thereof from a database (such as the database described with reference to FIG. 1).

In some cases, the diffusion model generates the low-resolution image by removing noise from the input image using a reverse diffusion process (such as the reverse diffusion process described with reference to FIGS. 5 and 12). In some cases, the low-resolution image is generated using multiple iterations of the diffusion model (e.g., multiple forward passes of a reverse diffusion process described with reference to FIG. 12). In some cases, the reverse diffusion process is guided by the text prompt, the image prompt, or a combination thereof.

In some cases, the first resolution is 128×128 pixels. In some cases, at least one side of the low-resolution image comprises 128 pixels. In some cases, at least one side of the low-resolution image comprises at least 128 pixels. In some cases, at least one side of the low-resolution image comprises at most 128 pixels. In some cases, an aspect ratio of the low-resolution image is different from 1:1. For example, in some cases, the first resolution is rectangular.

At operation 1115, the system generates a high-resolution image based on the low-resolution image using a generative adversarial network (GAN). In some cases, the operations of this step refer to, or may be performed by, a GAN as described with reference to FIGS. 4 and 8-10.

For example, in some cases, the GAN takes the output of the diffusion model (e.g., the low-resolution image or an embedding of the low-resolution image) as input and generates the high-resolution image by up-sampling the low-resolution image or the embedding of the low-resolution image. In some cases, the GAN generates the high-resolution image by generating a feature map corresponding to the low-resolution image or the low-resolution image embedding and performing convolution processes on the feature map to obtain the high-resolution image.

In some cases, the GAN takes the text embedding of the text prompt as input and performs the convolution processes based on the text embedding. In some cases, an image encoder (such as the image encoder described with reference to FIGS. 4 and 6) embeds an image prompt (e.g., an image prompt provided by a user or retrieved from a database) to obtain an image embedding. In some cases, the GAN takes the image embedding of the image prompt as input and performs the convolution processes using the image embedding as a guidance embedding to generate the high-resolution image. In some cases, the GAN generates the high-resolution image based on a style vector as described with reference to FIGS. 13-16.

In some cases, the diffusion model includes more parameters than the GAN. In some cases, the GAN generates the high-resolution image using a single iteration (e.g., a single forward pass) of the GAN. In some cases, at least one side of the high-resolution image comprises 1024 pixels. In some cases, at least one side of the high-resolution image comprises at least 1024 pixels. In some cases, an aspect ratio of the high-resolution image is the same as the aspect ratio of the low-resolution image. In some cases, the diffusion model and the GAN take variable resolution inputs.

In some cases, the image generation apparatus provides the high-resolution image to the user via the user interface. In some cases, the user interface displays the text prompt, the image prompt, the low-resolution image, the high-resolution image, or a combination thereof.

Figure 12:
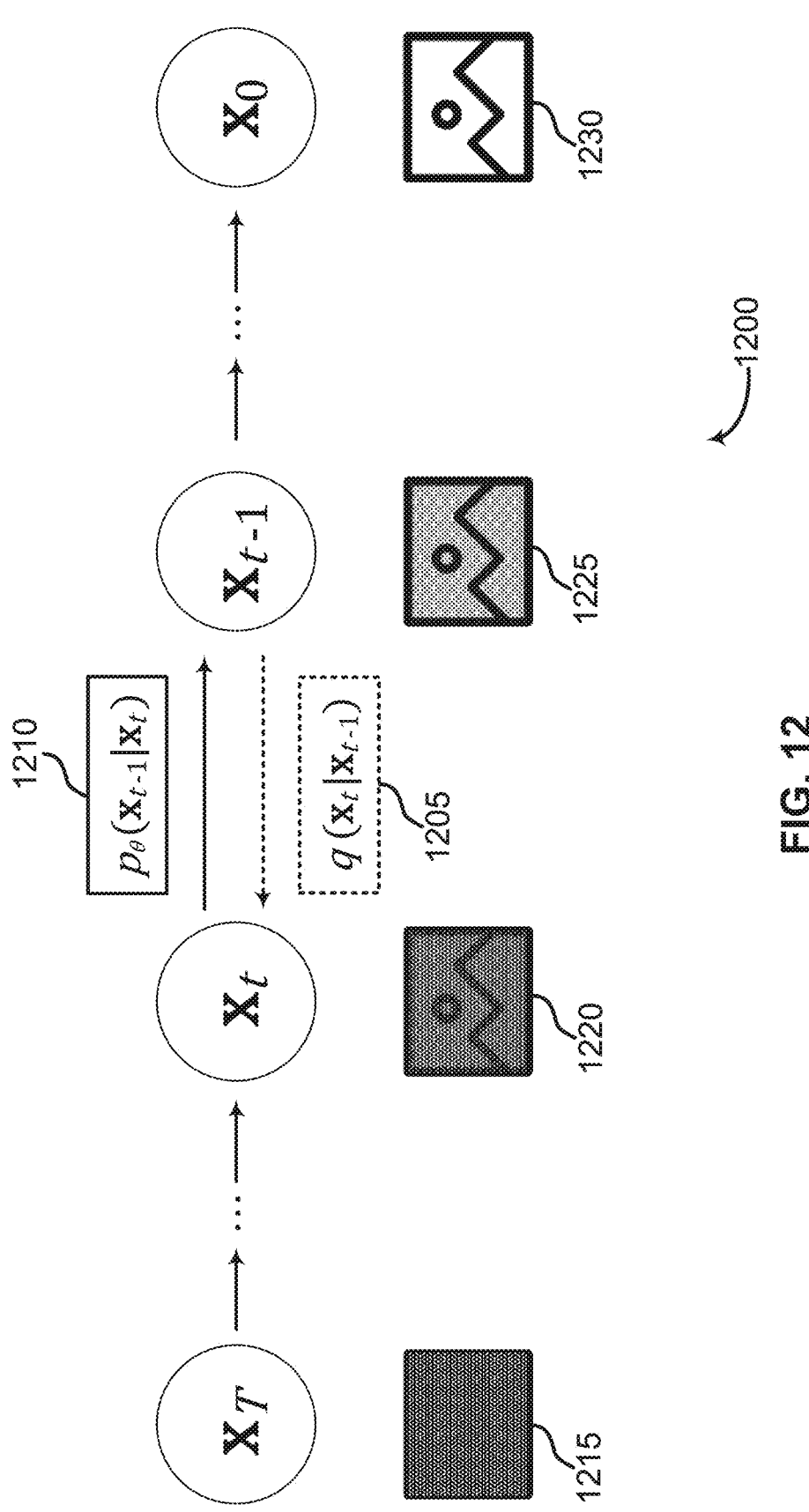
FIG. 12 shows an example of diffusion processes according to aspects of the present disclosure.

FIG. 12 shows an example of diffusion processes 1200 according to aspects of the present disclosure. The example shown includes diffusion processes 1200, forward diffusion process 1205, reverse diffusion process 1210, noisy image 1215, first intermediate image 1220, second intermediate image 1225, and low-resolution image 1230.

Forward diffusion process 1205 is an example of, or includes aspects of, the corresponding element described with reference to FIG. 5. Reverse diffusion process 1210 is an example of, or includes aspects of, the corresponding element described with reference to FIG. 5.

Referring to FIG. 12, in some cases, an image generation apparatus (such as the image generation apparatus described with reference to FIGS. 1 and 4) uses diffusion processes 1200 to generate a low-resolution image. In some cases, forward diffusion process 1205 adds first noise to an image (or image features in a latent space) to obtain a noisy image (or noisy image features) (e.g., an input image including random noise). In some cases, the image is an image prompt provided by the user or retrieved by the image generation apparatus. In some cases, the image is an initial noisy image including sampled noise. In some cases, reverse diffusion process 1210 removes second noise from the noisy image (or noisy image features in the latent space) to obtain a low-resolution image.

According to some aspects, a noise component as described with reference to FIG. 4 uses forward diffusion process 1205 to iteratively add Gaussian noise (e.g., first noise) to an original image (e.g., the image prompt or an initial noisy image) at each diffusion step t according to a known variance schedule $0 < \beta_1 < \beta_2 < \ldots < \beta_T < 1$:

$$q(x_t \mid x_{t-1}) = \mathcal{N}\left(x_t; \sqrt{1 - \beta_t}\, x_{t-1}, \beta_t I\right) \qquad (2)$$

According to some aspects, the Gaussian noise is drawn from a Gaussian distribution (e.g., with mean $\mu_t = \sqrt{1 - \beta_t} x_{t-1}$ and variance $\sigma^2 = \beta_t \geq 1$), in some cases by sampling $\epsilon \sim \mathcal{N}(0, I)$ and setting $x_t = \sqrt{1 - \beta_t} x_{t-1} + \sqrt{\beta_t}\, \epsilon$. Accordingly, in some cases, beginning with an initial input $x_0$ (e.g., an original image), forward diffusion process 1205 produces $x_1, \ldots, x_t, \ldots x_T$, where $x_T$ is pure Gaussian noise (e.g., a noisy image).

For example, in some cases, the noise component maps an observed variable $x_0$ in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, as the variables are passed through a neural network such as a U-Net to obtain an approximate posterior $q(x_{1:T} \mid x_0)$.

According to some aspects, during reverse diffusion process 1210, a diffusion model such as the diffusion model described with reference to FIGS. 4-6 gradually removes second noise (e.g., noise present in each sample x at each reverse diffusion step t) from noisy image $x_T$ to obtain a prediction of the observed variable $x_0$ (e.g., a representation of what the diffusion model thinks low-resolution image 1230 should be based on a mapping function F). A conditional distribution $p(x_{t-1} \mid x_t)$ of the observed variable x, is unknown to the diffusion model, however, as calculating the conditional distribution would require a knowledge of a distribution of all possible images. Accordingly, in some cases, the diffusion model is trained to iteratively approximate (e.g., learn) a conditional probability distribution $p_\theta$ $(x_{t-1} \mid x_t)$ of the conditional distribution $p(x_{t-1} \mid x_t)$ according to the mapping function F:

$$p_\theta(x_{t-1} \mid x_t) = \mathcal{N}\left(x_{t-1}; \mu_\theta(x_t, t), \sum\nolimits_\theta(x_t, t)\right) \qquad (3)$$

In some cases, a mean of the conditional probability distribution $p_\theta$ $(x_{t-1} \mid x_t)$ is parameterized by $\mu_\theta$ and a variance of the conditional probability distribution $p_\theta$ $(x_{t-1} \mid$ $x_t)$ is parameterized by $\tau_\theta$. In some cases, the mean and the variance are conditioned on a noise level t (e.g., an amount of noise corresponding to a diffusion step). According to some aspects, the diffusion model is trained to learn the mean and/or the variance.

According to some aspects, the diffusion model initiates reverse diffusion process 1210 with noisy data $x_T$ (such as noisy image 1215). According to some aspects, the diffusion model iteratively denoises the noisy data $x_T$ to obtain the conditional probability distribution $p_\theta(x_{t-1} \mid x_t)$. For example, in some cases, at each step t−1 of reverse diffusion process 1210, the diffusion model takes $x_t$ (such as first intermediate image 1220) and t as input, where t represents a step in a sequence of transitions associated with different noise levels, and iteratively outputs a prediction of $x_{t-1}$ (such as second intermediate image 1225) until the noisy data $x_T$ is reverted to a prediction of the observed variable $x_0$ (e.g., low-resolution image 1230).

In some cases, at each reverse diffusion step t, the diffusion model predicts the intermediate diffusion maps based on one or more guidance prompts, such as a text prompt, an image prompt, or a combination thereof as described with reference to FIG. 5. For example, in some cases, a text encoder (such as the text encoder described with reference to FIGS. 4-5, 8-10, and 19) generates a text embedding based on the text prompt, where the text embedding is used as guidance features as described with reference to FIG. 5. In some cases, an image encoder (such as the image encoder described with reference to FIGS. 4-5) generates an image embedding based on the image prompt, where the image embedding is used as guidance features as described with reference to FIG. 5.

According to some aspects, a joint probability of a sequence of samples in the Markov chain is determined as a product of conditionals and a marginal probability:

$$x_T : p_\theta(x_{0:T}) := p(x_T) \prod\nolimits_{t=1}^{T} p_\theta(x_{t-1} \mid x_t) \qquad (4)$$

In some cases, $p(x_T) = \mathcal{N}(x_T; 0, I)$ is a pure noise distribution, as reverse diffusion process 1210 takes an outcome of forward diffusion process 1205 (e.g., a sample of pure noise $x_T$) as input, and $$\prod\nolimits_{t=1}^{T} p_\theta(x_{t-1} \mid x_t)$$

represents a sequence of Gaussian transitions corresponding to a sequence of addition of Gaussian noise to a sample.

Figure 13:
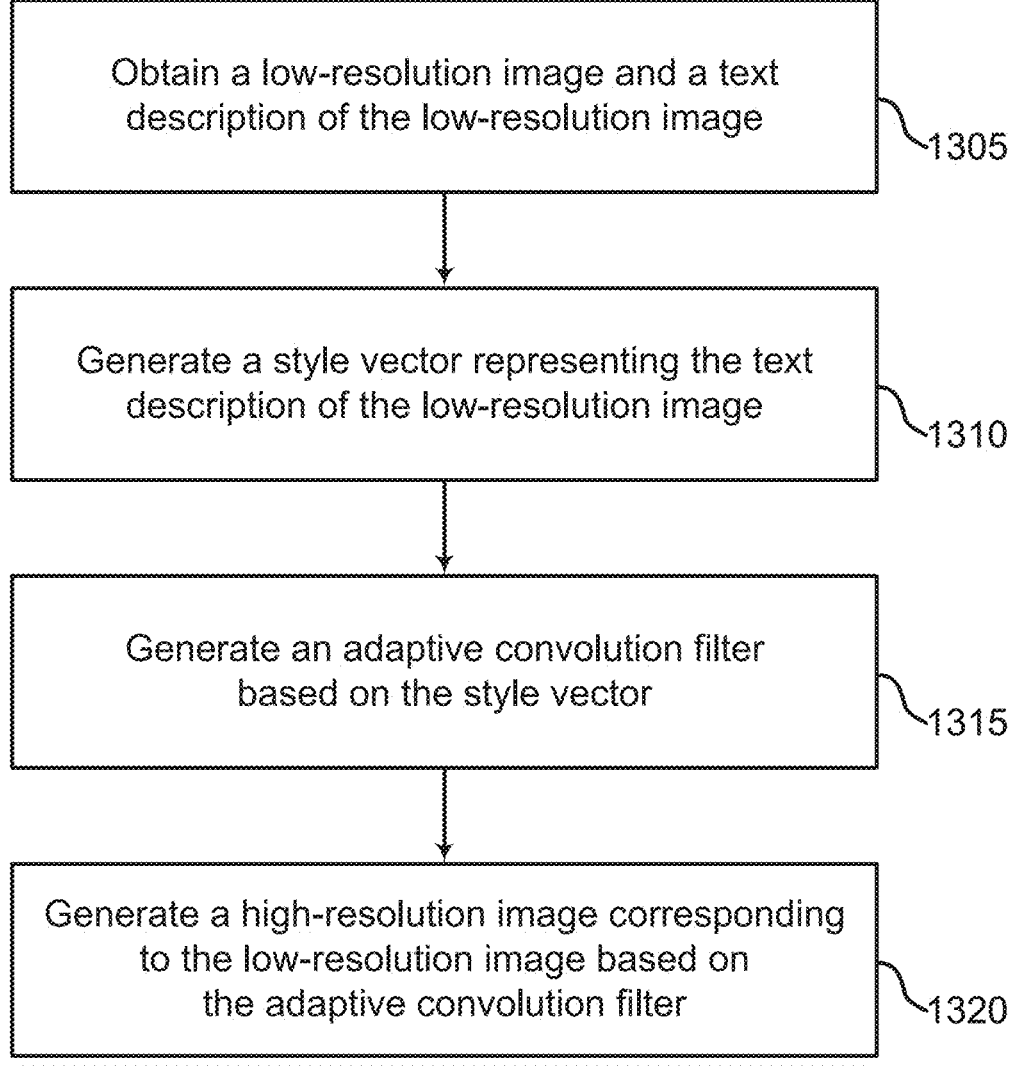
FIG. 13 shows an example of a method for generating a high-resolution image according to aspects of the present disclosure.

FIG. 13 shows an example of a method 1300 for generating a high-resolution image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, an image generation apparatus (such as the image generation apparatus described with reference to FIGS. 1 and 4) uses a GAN of a machine learning model (such as the GAN and machine learning model described with reference to FIGS. 4 and 8-10) to generate a high-resolution image based on a text prompt. By generating the image based on the text prompt, the image generation apparatus allows a layperson to quickly and easily generate a high-quality image without needing an original image as an initial input. Furthermore, by generating the image based on a text prompt, the image generation apparatus increases an automation possibility of an image generation process (for example, by generating images in response to automatically generated text input).

In some cases, the GAN generates a style vector based on the text prompt, and generates the image based on the text prompt. The style vector allows the GAN to control information corresponding to attributes of the image throughout a process of generating the image, resulting in a higher-quality image.

In some cases, the GAN generates an adaptive convolution filter from a bank of convolution filters based on the style vector. In some cases, the image generation apparatus generates the image based on the adaptive convolution filter. By generating the adaptive convolution filter based on the bank of convolution filters, the convolution capacity of the GAN is increased, thereby increasing the speed of the image generation process and increasing the quality of the image, without being computationally impractical.

At operation 1305, the system obtains a low-resolution image and a text description of the low-resolution image. In some cases, the operations of this step refer to, or may be performed by, a machine learning model as described with reference to FIGS. 4-5 and 8-10. For example, in some cases, the low-resolution image is output by the diffusion model as described with reference to FIG. 11. In some cases, the text description is the text prompt described with reference to FIG. 11.

At operation 1310, the system generates a style vector representing the text description of the low-resolution image. In some cases, the operations of this step refer to, or may be performed by, a mapping network as described with reference to FIGS. 4 and 8-10. For example, in some cases, a style vector w is generated as described with reference to FIG. 15.

At operation 1315, the system generates an adaptive convolution filter based on the style vector. In some cases, the operations of this step refer to, or may be performed by, an adaptive convolution component as described with reference to FIG. 4.

A machine learning model having an enhanced capacity of convolution filters is able to take advantage of a large and diverse training set to learn to output high-quality images. However, naïvely increasing a width of convolution layers in a comparative GAN becomes computationally impractical as a same operation needs to be repeated across all locations. Accordingly, in some cases, the expressivity of convolution filters of the GAN is instead efficiently enhanced by creating a convolution filter on-the-fly based on a conditioning vector c (such as the conditioning vector c$\in$ $\mathbb{R}^{C \times 1024}$ described with reference to FIG. 15) as described with reference to FIG. 14.

At operation 1320, the system generates a high-resolution image corresponding to the low-resolution image based on the adaptive convolution filter. In some cases, the operations of this step refer to, or may be performed by, a GAN as described with reference to FIGS. 4, 8-10, and 19. In some cases, the GAN generates the high-resolution image as described with reference to FIGS. 15 and 16.

Figure 14:
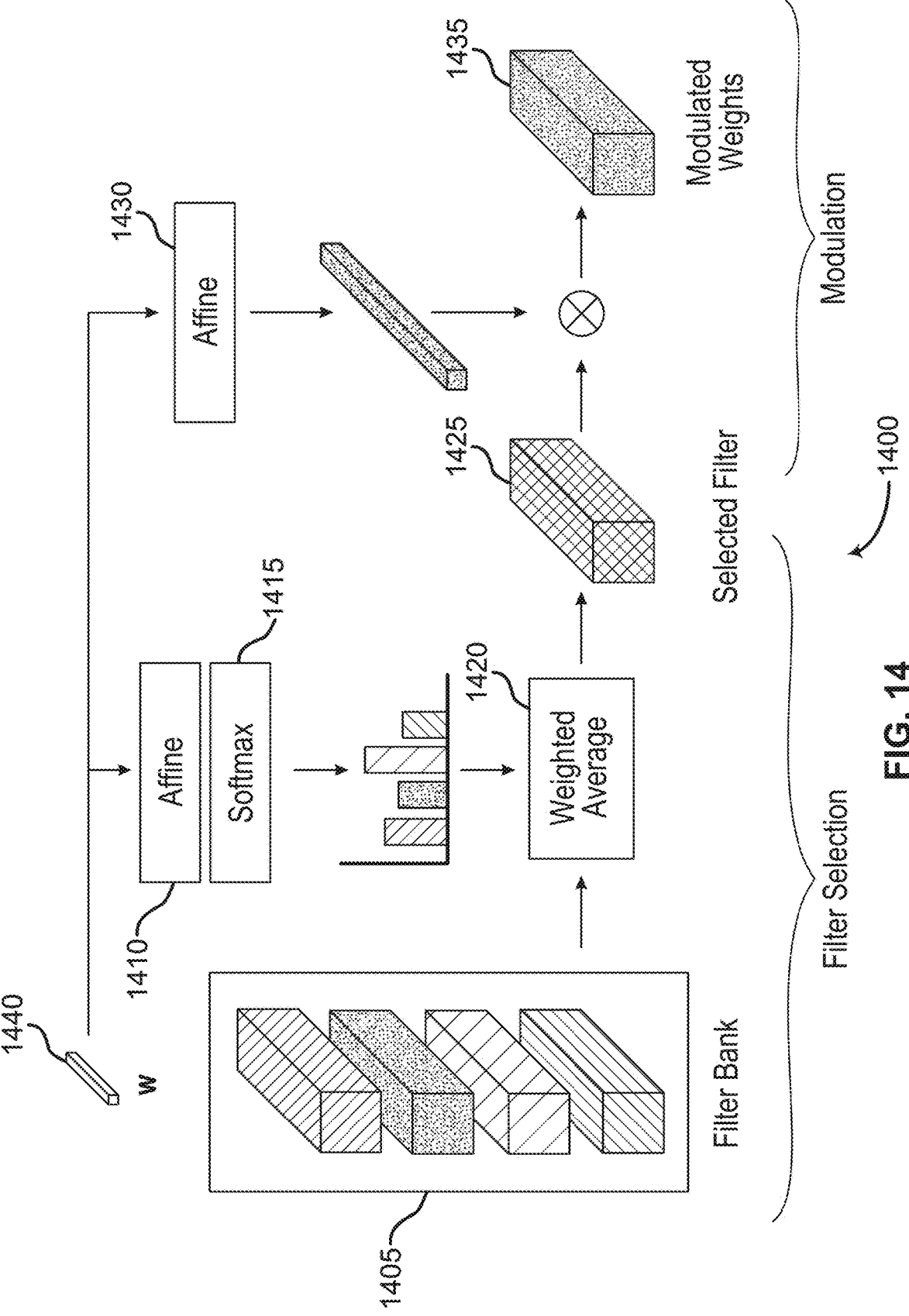
FIG. 14 shows an example of adaptive convolution filter generation according to aspects of the present disclosure.

FIG. 14 shows an example of adaptive convolution filter generation according to aspects of the present disclosure. The example shown includes convolution block 1400 and style vector 1440.

Convolution block 1400 is an example of, or includes aspects of, the corresponding element described with reference to FIGS. 8-10. In one aspect, convolution block 1400 includes filter bank 1405, first affine layer 1410, softmax 1415, weighted average 1420, adaptive convolution filter 1425, second affine layer 1430, and modulated weights 1435. Style vector 1440 is an example of, or includes aspects of, the corresponding element described with reference to FIGS. 8-10.

Referring to FIG. 14, according to some aspects, convolution block 1400 is included in a convolution block such as the convolution block described with reference to FIGS. 8-10. In some cases, an adaptive filter component (such as the adaptive filter component described with reference to FIG. 4) instantiates filter bank 1405, e.g., a set of N predetermined convolution filters $$\{K_i \in \mathbb{R}^{C_{in} \times C_{out} \times K \times K}\}_{i=1}^{N},$$

rather than one convolution filter. In some cases, filter bank 1405 takes a feature f$\in$ $\mathbb{R}^{C_{in}}$. In some cases, style vector 1440 (e.g., a style vector w$\in$ $\mathbb{R}^{d}$ generated based on the conditioning vector c as described with reference to FIG. 15) then goes through an affine layer [W$_{filt}$,b$_{filt}$]$\in$ $\mathbb{R}^{(d+1) \times N}$ (e.g., first affine layer 1410), where b is a bias and W is a weight, and softmax 1415 to predict a set of weights W to average across the convolution filters (e.g., weighted average 1420) to generate adaptive convolution filter 1425, e.g., an aggregated or combined filter K$\in$ $\mathbb{R}^{C_{in}C_{out} \times K \times K}$.

$$K = \sum_{i=1}^{N} K_i \cdot \text{softmax}\left(W_{filt}^T w + b_{filt}\right)_i \tag{5}$$

In some cases, the softmax-based weighting can be viewed as a differentiable filter selection process based on input conditioning. Furthermore, in some cases, as the filter selection process is performed once at each layer, the selection process is much faster than the actual convolution process, thereby effectively decoupling computing complexity from image resolution. In some cases, then, a convolution filter is dynamically selected based on an input conditioning.

In some cases, adaptive convolution filter 1425 is used in a convolution pipeline of the GAN. For example, in some cases, the GAN implements a similar convolution pipeline as the synthesis network described with reference to FIG. 7. In some cases, a second affine layer $$\left[W_{mod}^T, b_{mod}\right] \in \mathbb{R}^{(d+1) \times C_{in}}$$

(e.g., second affine layer 1430) is used for weight modulation or weight demodulation:

$$g_{adaconv}(f, w) = \left(\left(W_{mod}^T w + b_{mod}\right) \otimes K\right) * f \tag{6}$$

In some cases, ⊗ represents weight modulation or weight demodulation and * represents convolution.

Figure 15:
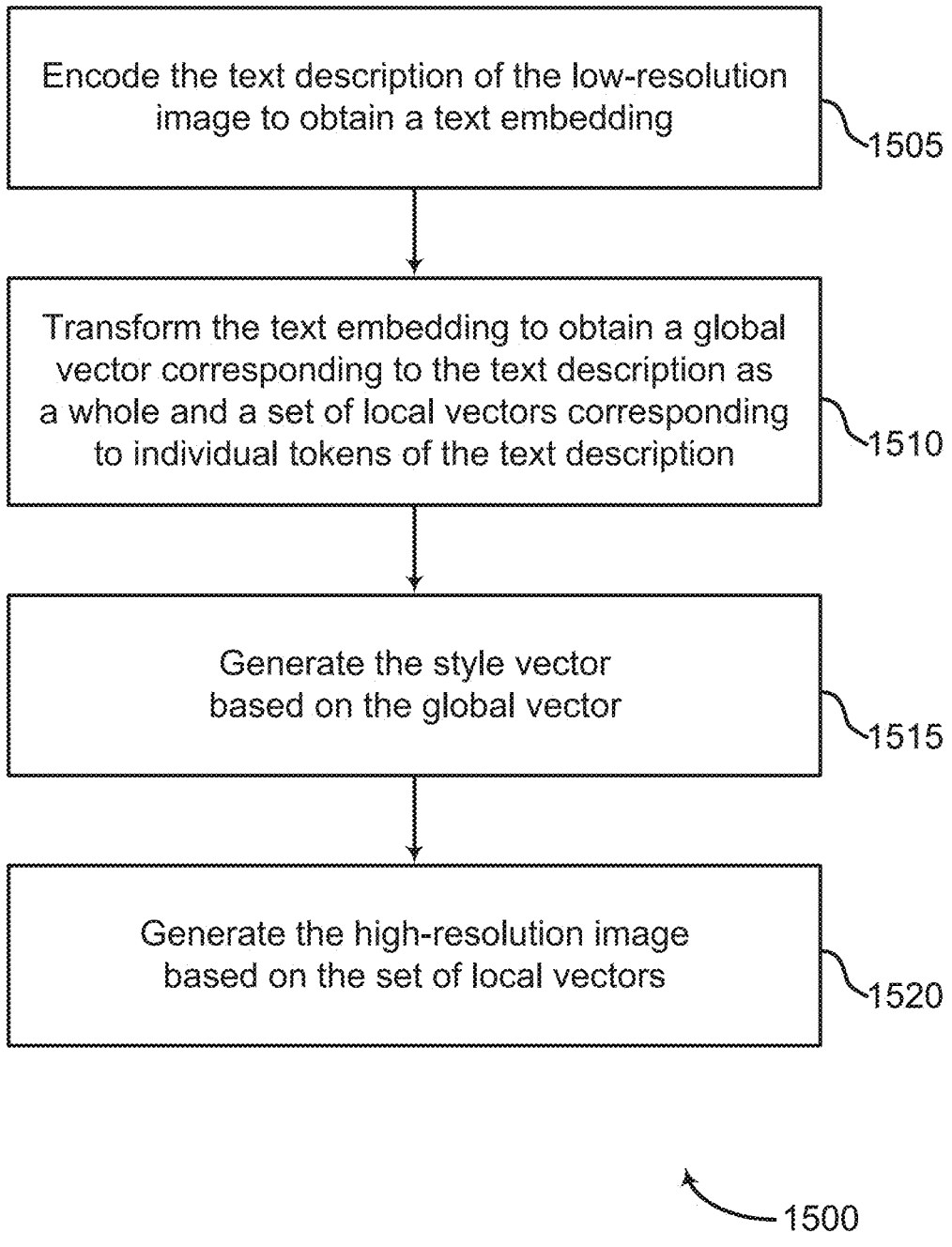
FIG. 15 shows an example of a method for generating a style vector according to aspects of the present disclosure.

FIG. 15 shows an example of a method 1500 for generating a style vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 15, an image generation apparatus such as the image generation apparatus described with reference to FIGS. 1 and 4 generates a style vector based on a text prompt.

At operation 1505, the system encodes the text description of the low-resolution image to obtain a text embedding. In some cases, the operations of this step refer to, or may be performed by, a text encoder as described with reference to FIGS. 4-5, 8-10, and 19. In some cases, the text description is the text prompt, and the text embedding is the text embedding used by the diffusion model.

In some cases, the text encoder generates the text embedding via a pretrained encoder (such as the pretrained encoder described with reference to FIGS. 8-10). In some cases, the pretrained encoder is a CLIP model. In some cases, the pretrained encoder pads the text prompt to C words. In some cases, C=77. In some cases, the pretrained encoder tokenizes the text prompt to produce a conditioning vector $c \in \mathbb{R}^{C \times 1024}$. In some cases, the pretrained encoder embeds the text prompt to obtain word embeddings. In some cases, the text encoder uses features from a penultimate layer of a frozen CLIP feature extractor to leverage the pretraining of the pretrained encoder. In some cases, the text encoder uses a learned encoder (such as the learned encoder described with reference to FIGS. 8-10) to process the output of the pretrained encoder to obtain text embedding $t = T(CLIP(c)) \in \mathbb{R}^{C \times 1024}$. In some cases, the attention layers of the learned encoder allow for additional flexibility.

At operation 1510, the system transforms the text embedding to obtain a global vector corresponding to the text prompt as a whole and a set of local vectors corresponding to individual tokens of the text description. In some cases, the operations of this step refer to, or may be performed by, a text encoder as described with reference to FIGS. 4-5, 8-10, and 19.

For example, according to some aspects, each component $t_i$ of the text embedding t is an embedding of an i-th word in the text prompt. In some cases, the learned encoder transforms each component $t_i$ to a corresponding local vector $t_{local} = t_{\{1:C\} \setminus EOF} \in \mathbb{R}^{(C-1) \times 1024}$ in a set of local vectors, where EOF refers to an end of field component of the text embedding t. In some cases, the end of field component of the text embedding t aggregates global information of the text prompt (e.g., the information as a whole), and the learned encoder therefore transforms the EOF component to a global vector $t_{global} \in \mathbb{R}^{1024}$ that corresponds to the text prompt as a whole.

At operation 1515, the system generates the style vector based on the global vector. In some cases, the operations of this step refer to, or may be performed by, a mapping network as described with reference to FIGS. 8-10. For example, in some cases, the mapping network M processes the global vector $t_{global} \in \mathbb{R}^{1024}$ and a latent code $z \sim N(0,1) \in$ $\mathbb{R}^{128}$ (e.g., in some cases, a noise vector sampled from a normal distribution in a latent space $\mathbb{R}$) to extract a style vector $w = M(z, t_{global})$ in an intermediate latent space W.

At operation 1520, the system generates the high-resolution image based on the set of local vectors. In some cases, the operations of this step refer to, or may be performed by, a GAN as described with reference to FIGS. 4, 8-10, and 19. For example, in some cases, the GAN performs a cross-attention process based on the set of local vectors. In some cases, the GAN includes a set of attention blocks. In some cases, at each attention block, the cross-attention process $g_{cross-attention}$ attends to the set of local vectors representing individual word embeddings, thereby increasing an alignment between the text prompt and the high-resolution image. In some cases, for cross-attention process $g_{cross-attention}$, an input feature tensor (e.g., a feature map corresponding to the low-resolution image, such as the feature map described with reference to FIG. 8) is a query, the set of local vectors are a key and a value.

In some cases, the set of local vectors are used as features for cross-attention in the GAN $\tilde{G}$ for generating an image $x \in \mathbb{R}^{H \times W \times 3}$ (e.g., the high-resolution image):

$$x = \tilde{G}(w, t_{local}) \tag{7}$$

Figure 16:
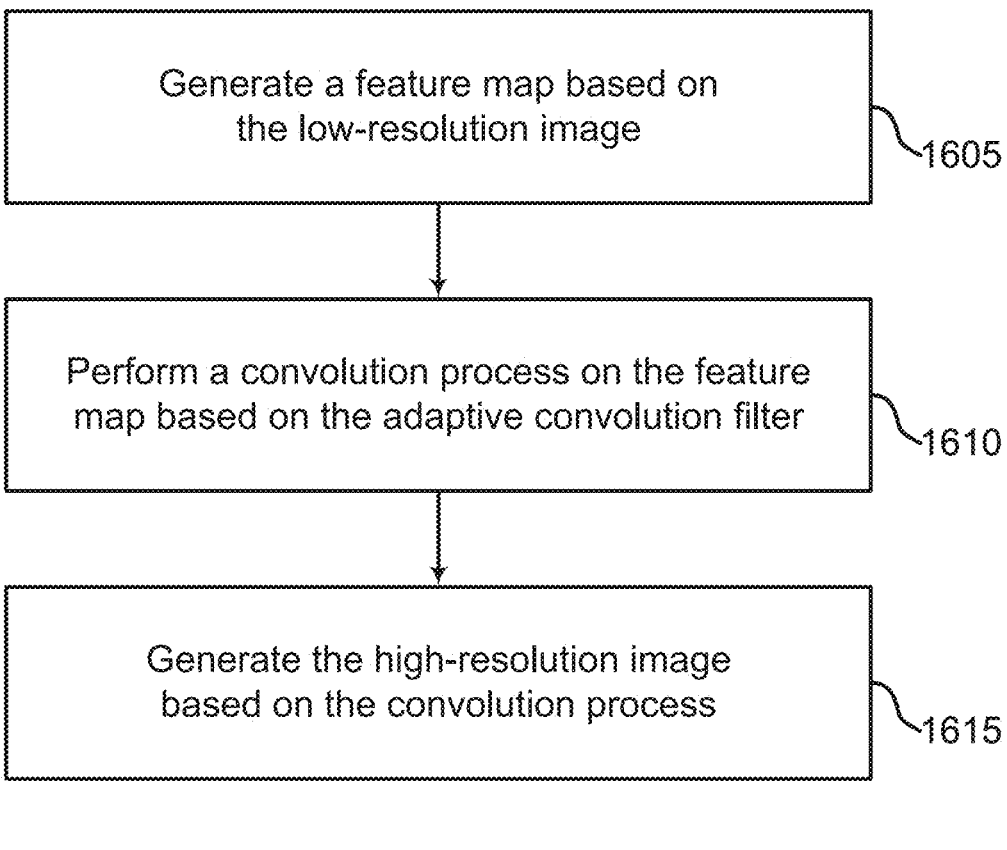
FIG. 16 shows an example of a method for generating a high-resolution image via a convolution process.

FIG. 16 shows an example of a method 1600 for generating a high-resolution image via a convolution process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system generates a feature map based on the low-resolution image. In some cases, the operations of this step refer to, or may be performed by, a generative adversarial network (GAN) as described with reference to FIGS. 4, 8-10, and 19.

For example, a filter or feature detector helps identify different features present in the low-resolution image. In some examples, the GAN applies the filter or feature detector to the low-resolution image or an embedding of the low-resolution image to generate a feature map (such as the feature map described with reference to FIG. 8). In some cases, the feature map is a learned feature map. In some cases, the GAN learns the feature map by being trained to learn the feature map. In some cases, the feature map respectively corresponds to features of pixels of the low-resolution image. In some cases, the feature map is a constant.

At operation 1610, the system performs a convolution process on the feature map based on the adaptive convolution filter. In some cases, the operations of this step refer to, or may be performed by, a GAN as described with reference to FIGS. 4, 8-10, and 19.

For example, in some cases, performing the convolution process includes applying the adaptive convolution filter over the feature map. In some cases, performing the convolution process generates output that captures the learned features of the low-resolution images, and the high-resolution images may be generated based on the output. For example, the learned features of the low-resolution images may be features that the adaptive convolution filter has learned to recognize for a specific task, in contrast to the features in the feature map that are recognized based on a predetermined set of parameters. The output of the convolution process may be a representation of the low-resolution image in terms of the learned features that are relevant to the specific task.

In some cases, the GAN performs a convolution process on the feature map based on the adaptive convolution filter (such as the adaptive convolution filter K described with reference to FIGS. 13-14). For example, in some cases, the GAN is trained to process the feature map using the adaptive convolution filter to predict a high-resolution image $x \in \mathbb{R}^{H \times W \times 3}$, where the convolution layer including the adaptive convolution filter is modulated by the style vector.

According to some aspects, the GAN performs a self-attention process based on the feature map. For example, in some cases, the adaptive convolution layer is helped to contextualize itself in relationship to a distant part of the image by processing the feature map using a self-attention layer $g_{attention}$. In some cases, a self-attention layer $g_{attention}$ is interleaved with a convolutional block of the GAN, leveraging the style vector as an additional token. Accordingly, in some cases, the self-attention layer $g_{attention}$ injects more expressivity into the parameterization of the machine leaning model by capturing long-range dependence.

In some cases, a naïve addition of attention layers to a machine learning model such as the comparative machine learning model described with reference to FIG. 7 may cause training to collapse, possibly because a dot-product self-attention process is not Lipschitz. Accordingly, in some cases, a self-attention layer of the GAN uses an L2 distance (e.g., a Euclidean distance) as an attention logit to promote Lipschitz continuity. In some cases, a performance of the GAN is increased by scaling down the L2 distance attention logit to roughly match a unit normal distribution at initialization. In some cases, a performance of the GAN is increased by reducing a residual gain from the self-attention layer $g_{attention}$. In some cases, a performance of the GAN is increased by tying a key and query matrix of the self-attention layer $g_{attention}$ and applying weight decay to the key and query matrix.

At operation 1615, the system generates the high-resolution image based on the convolution process. In some cases, the operations of this step refer to, or may be performed by, a GAN as described with reference to FIGS. 4, 8-10, and 19. For example, in some cases, the GAN generates the high-resolution image as a result of the convolution process. In some cases, the GAN controls the quality of the high-resolution image via the convolution layer. In some cases, the GAN generates different high-resolution images using convolution filters whose weights are adjusted based on the style vector.

Training

Figure 17:
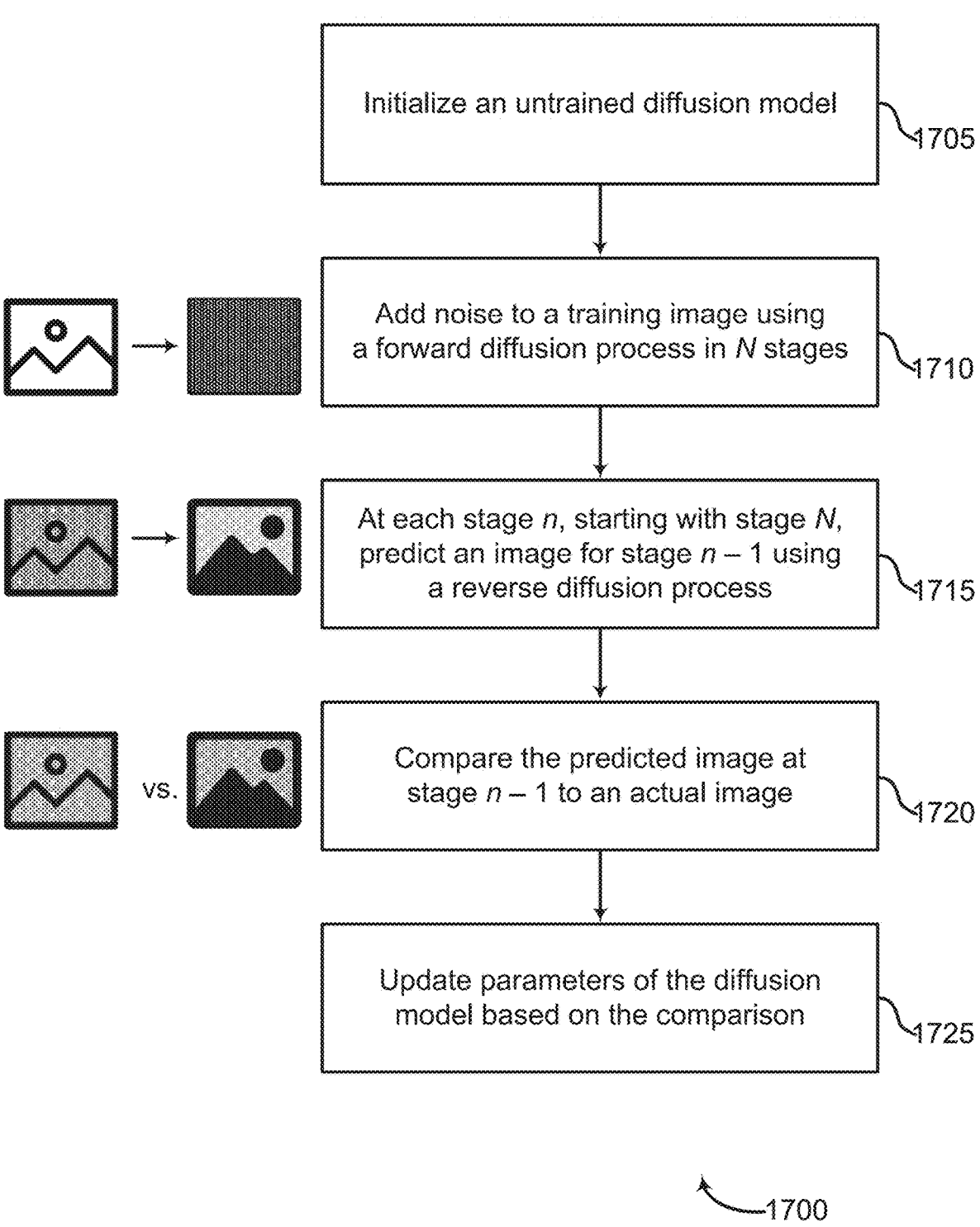
FIG. 17 shows an example of a method for training a diffusion model according to aspects of the present disclosure.

FIG. 17 shows an example of a method 1700 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 17, the system trains an untrained diffusion model to implement the trained diffusion model as the image generation model described with reference to FIGS. 4-6.

At operation 1705, the system initializes an untrained diffusion model. In some cases, the operations of this step refer to, or may be performed by, a training component as described with reference to FIGS. 4 and 19.

In some cases, the initialization includes defining the architecture of the untrained diffusion model and establishing initial values for parameters of the untrained diffusion model. In some cases, the training component initializes the untrained diffusion model to implement a U-Net architecture described with reference to FIG. 6. In some cases, the initialization includes defining hyper-parameters of the architecture of the untrained diffusion model, such as a number of layers, a resolution and channels of each layer block, a location of skip connections, and the like.

At operation 1710, the system adds noise to a training image using a forward diffusion process in N stages. In some cases, the operations of this step refer to, or may be performed by, the training component.

At operation 1715, at each stage n, starting with stage N, the system predicts an image for stage n−1 using a reverse diffusion process. In some cases, the operations of this step refer to, or may be performed by, the untrained diffusion model. According to some aspects, the untrained diffusion model performs a reverse diffusion process as described with reference to FIGS. 5-6 and 12, where each stage n corresponds to a diffusion step t, to predict noise that was added by the forward diffusion process. In some cases, at each stage, the untrained diffusion model predicts noise that can be removed from an intermediate image to obtain the predicted image. In some cases, an original image is predicted at each stage of the training process.

At operation 1720, the system compares the predicted image at stage n−1 to an actual image (or image features), such as the image at stage n−1 or the original training image. In some cases, the operations of this step refer to, or may be performed by, the training component. For example, in some cases, the training component computes a loss (e.g., a mean squared error) based on the predicted image and the training image. For example, in some cases, the training component determines the mean squared error between noise predicted by the diffusion model and real noise added to the training image.

The term "loss function" refers to a function that impacts how a machine learning model is trained in a supervised learning model. Specifically, during each training iteration, the output of the model is compared to the known annotation information in the training data. The loss function provides a value (the "loss") for how close the predicted annotation data is to the actual annotation data. After computing the loss function, the parameters of the model are updated accordingly, and a new set of predictions are made during the next iteration.

At operation 1725, the system updates parameters of the untrained diffusion model based on the comparison. In some cases, the operations of this step refer to, or may be performed by, the training component. For example, in some cases, the training component updates parameters of the U-Net using gradient descent. In some cases, the training component trains the U-Net to learn time-dependent parameters of the Gaussian transitions. Accordingly, by updating parameters of the untrained diffusion model, the training component obtains a trained diffusion model.

FIG. 18 shows an example of a method 1800 for training a generative adversarial network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 18, in some cases, a machine learning model (such as the machine learning model described with reference to FIGS. 4-6, 8-10, and 19) is trained using a discriminator network D(x,c) to judge a realism of an image generated by a GAN as compared to a sample from a training dataset $\mathcal{D}$ including image-text pairs.

At operation 1805, the system obtains the training dataset $\mathcal{D}$ including a high-resolution (e.g., 1024×1024 pixel) training image, a text description of the high-resolution training image, and a low-resolution training image corresponding to the high-resolution training image. In some cases, the operations of this step refer to, or may be performed by, a training component as described with reference to FIGS. 4 and 19. In some cases, the training component retrieves the training dataset $\mathcal{D}$ from a database (such as the database described with reference to FIG. 1). In some cases, the training component receives the training dataset $\mathcal{D}$ from a user (such as the user described with reference to FIG. 1). In some cases, the training component obtains the training dataset $\mathcal{D}$ by resizing the high-resolution training image to a lower resolution (e.g., 64×64 pixel or 128×128 pixel) to obtain the low-resolution training image. In some cases, the training component resizes the high-resolution training image by randomly choosing between a bilinear, bicubic, and Lanczos resizing method and applying the randomly chosen resizing method to the high-resolution training image.

In some cases, the training component uses a forward diffusion process (such as the forward diffusion process described with reference to FIGS. 5-6, 12, and 17) to iteratively add noise to the low-resolution training image to obtain an augmented low-resolution training image. In some cases, during the forward diffusion process, the training component injects random Gaussian noise (randomly sampled between 0% and 10%) to the low-resolution training image.

At operation 1810, the system generates a predicted style vector representing the low-resolution training image or the augmented low-resolution training image using a mapping network. In some cases, the operations of this step refer to, or may be performed by, a mapping network as described with reference to FIGS. 4 and 8-10. For example, in some cases, a text encoder (such as the text encoder described with reference to FIGS. 4-5, 8-10, and 19) encodes the text description of the low-resolution training image or the augmented low-resolution training image to obtain a conditioning vector c, a set of local vectors, a global vector, or a combination thereof as described with reference to FIGS. 8-11 and 13-16. In some cases, the mapping network generates a predicted style vector based on the global vector and a sampled latent code in a similar manner as the style vector w is generated as described with reference to FIGS. 11, 13, and 15. In some cases, affine transform and softmax operation are performed to generate the predicted style vector.

At operation 1815, the system generates a predicted high-resolution image based on the low-resolution training image (or the augmented low-resolution training image) and the predicted style vector using a GAN. In some cases, the operations of this step refer to, or may be performed by, a GAN as described with reference to FIGS. 4, 8-10, and 19. For example, in some cases, the GAN generates the predicted high-resolution image in a similar manner as the high-resolution image is generated as described with reference to FIGS. 11-16.

According to an embodiment, the predicted style vector is input to each convolution layer of the GAN to control the strength of the image features of the predicted high-resolution image at different scales. For example, in some cases, the predicted style vector is input to one or more convolution layers of the GAN.

At operation 1820, the system generates a discriminator image embedding based on the predicted high-resolution image using a discriminator network. In some cases, the operations of this step refer to, or may be performed by, a discriminator network as described with reference to FIGS. 4 and 19.

According to some aspects, the discriminator network comprises self-attention layers without conditioning. In some cases, to incorporate conditioning in the self-attention layers, the machine learning model leverages a modified projection-based discriminator. For example, in some cases, the discriminator network D(·,·) comprises a convolutional branch $\phi(\cdot)$ and a conditioning branch $\psi(\cdot)$. In some cases, the convolutional branch $\phi(\cdot)$ generates the discriminator image embedding $\phi(x)$ using the predicted image x. In some cases, the conditioning branch $\psi(\cdot)$ generates the conditioning embedding $\psi(c)$ using the conditioning vector c. In some cases, a prediction of the discriminator network is the dot product of the discriminator image embedding $\phi(x)$ and the conditioning embedding $\psi(c)$:

$$D(x, c) = \phi(x)^T \psi(c) \qquad (8)$$

According to some aspects, a discrimination power of the GAN is strengthened by ensembling a pretrained CLIP image encoder with an adversarial discriminator, e.g., a vision-aided discriminator. During training, the CLIP encoder may not be trained and the training component trains a series of linear layers connected to each of the convolution layers of the encoder using a non-saturating loss. In some examples, the vision-aided CLIP discriminator, compared to a traditional discriminator, backpropagates more informative gradients to the generator and improves the quality of the synthesized images.

At operation 1825, the system trains the GAN based on the discriminator image embedding. In some cases, the operations of this step refer to, or may be performed by, a training component as described with reference to FIGS. 4 and 19. For example, in some cases, the training component trains the GAN as described with reference to FIG. 19. In some cases, the GAN is trained by focusing on low-resolution images initially and then progressively shifting focus on high-resolution images. In some cases, the GAN is trained to recover the high-resolution training image from the low-resolution training image and the text description. In some cases, by training the GAN based on the predicted high-resolution training image generated based on the augmented low-resolution training image, the generalization of the GAN is increased.

In some cases, a high-capacity 64-pixel base GAN is learned, and then a 64-pixel to 512-pixel GAN-based up-sampler is trained. Accordingly, by training a text-conditioned image generation pipeline in two separate stages, a higher-capacity 64-pixel base model is accomplished using same computing resources.

Figure 19:
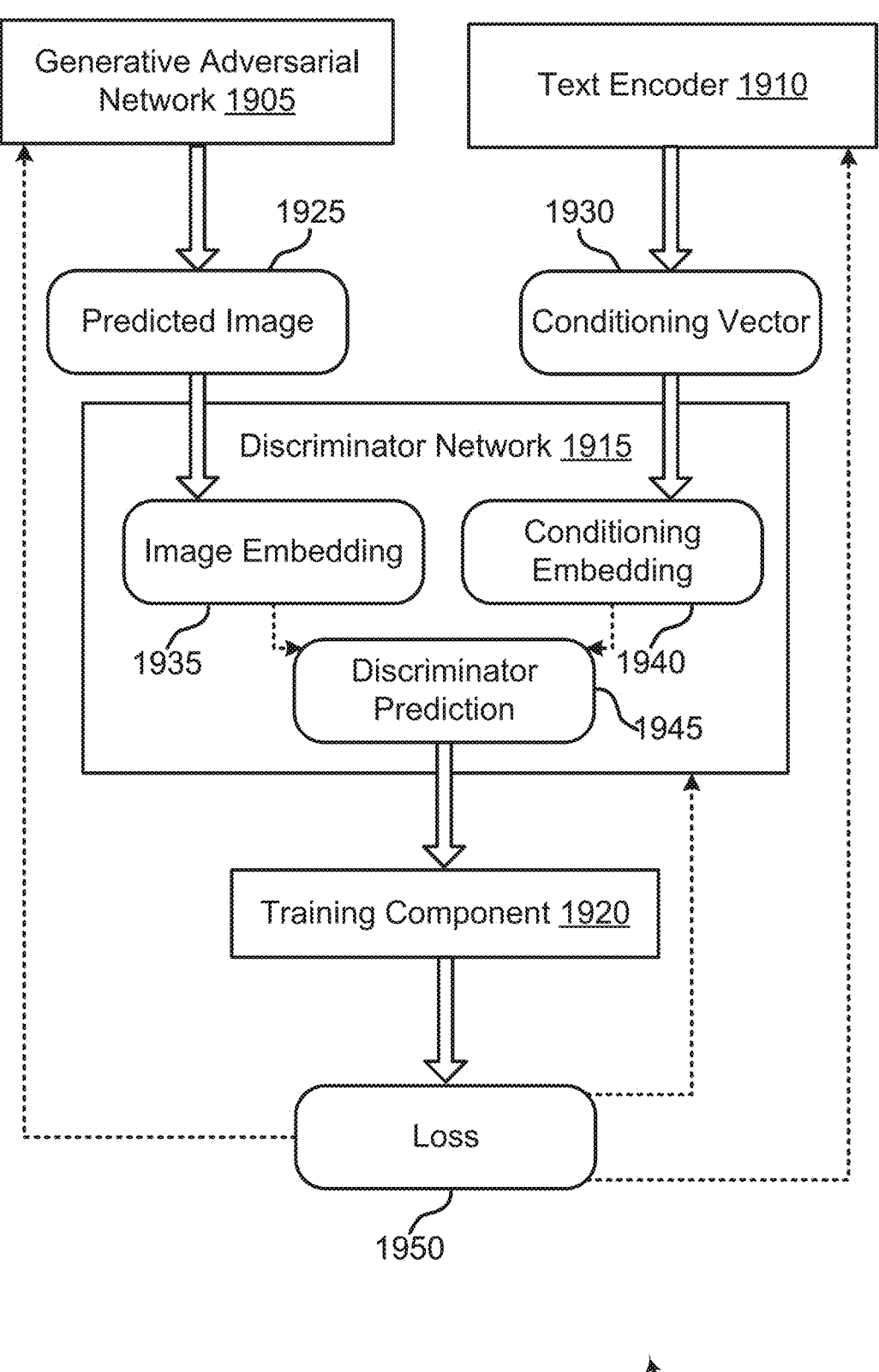
FIG. 19 shows an example of training a machine learning model according to aspects of the present disclosure.

FIG. 19 shows an example 1900 of training a machine learning model according to aspects of the present disclosure. The example shown includes generative adversarial network (GAN) 1905, text encoder 1910, discriminator network 1915, training component 1920, predicted image 1925, conditioning vector 1930, discriminator image embedding 1935, conditioning embedding 1940, discriminator prediction 1945, and loss 1950.

GAN 1905 is an example of, or includes aspects of, the corresponding element described with reference to FIGS. 4 and 8-10. Text encoder 1910 is an example of, or includes aspects of, the corresponding element described with reference to FIGS. 4, 5, and 8-10. Discriminator network 1915 is an example of, or includes aspects of, the corresponding element described with reference to FIG. 4. Training component 1920 is an example of, or includes aspects of, the corresponding element described with reference to FIG. 4.

Referring to FIG. 19, in some cases, discriminator network 1915 generates discriminator image embedding 1935 based on predicted image 1925 (e.g., the predicted high-resolution training image described with reference to FIG. 18) provided by GAN 1905 and generates conditioning embedding 1940 based on conditioning vector 1930 provided by text encoder 1910 as described with reference to FIG. 18. In some cases, discriminator network 1915 determines discriminator prediction 1945 based on discriminator image embedding 1935 and conditioning embedding 1940 as described with reference to FIG. 18.

According to some aspects, training component 1920 computes one or more losses 1950 according to one or more loss functions based on discriminator prediction 1945. For example, in some cases, training component 1920 computes a generative adversarial network (GAN) loss (e.g., loss 1950) based on discriminator image embedding 1935 and conditioning embedding 1940:

$$\mathcal{L}_{GAN,real} = \mathbb{E}_{x,c \sim p_{data}}\left[\log\left(1 + \exp\left(-\phi(x)^T \psi(c)\right)\right)\right] \quad (9)$$

$$\mathcal{L}_{GAN,fake} = \mathbb{E}_{x,c \sim p_{fake}}\left[\log\left(1 + \exp\left(\phi(x)^T \psi(c)\right)\right)\right] \quad (10)$$

In some cases, the GAN loss is a non-saturating GAN loss. In some cases, training component 1920 updates GAN 1905 by backpropagating the GAN loss through GAN 1905. In some cases, training component 1920 updates the discriminator parameters of discriminator network 1915 by backpropagating the GAN loss through discriminator network 1915.

According to some aspects, the pretrained encoder of text encoder 1910 described with reference to FIGS. 8-10 is frozen during training. According to some aspects, a series of linear layers comprised in the learned encoder described with reference to FIGS. 8-10 is trained together with GAN 1905 using the GAN loss. According to some aspects, the series of linear layers are connected to convolution layers of the pretrained encoder. In some cases, by training the learned encoder together with GAN 1905, a vision-aided discriminator is provided that allows for backpropagation of more-informative gradients to GAN 1905, which increases a quality of an image generated by GAN 1905.

In some cases, discriminator network 1915 generates a mixed conditioning embedding based on an unrelated text. For example, in some cases, discriminator prediction 1945 is a measurement of how much the predicted high-resolution training image x aligns with the conditioning vector c. However, in some cases, discriminator prediction 1945 may be made without considering conditioning due to a collapse of conditioning embedding 1940 to a same constant irrespective of conditioning vector 1930. Accordingly, in some cases, to force discriminator network 1915 to use conditioning, a text $x_i$ is matched with an unrelated condition vector $c_{j\neq i}$ taken from another sample in a minibatch $$\{(x_i, c_i)\}_i^N$$

of the training dataset $\mathcal{D}$ described with reference to FIG. 18, and the text $x_i$ and the unrelated condition vector $c_j$ are presented as fakes. In some cases, the discriminator network generates the mixed conditioning embedding $\psi(c_j)$ based on the unrelated condition vector $c_j$.

In some cases, training component 1920 computes a mixing loss $\mathcal{L}_{mixaug}$ (e.g., loss 1950) based on the discriminator image embedding $\phi(x)$ and the mixed conditioning embedding $\psi(c_j)$:

$$\mathcal{L}_{mixaug} = \mathbb{E}_{\{(x_i,c_i)\}_i^N \sim p_{data}}\left[\frac{1}{N-1}\sum_{j\neq i}\log\left(1 + \exp\left(-\phi(x_i)^T\psi(c_j)\right)\right)\right] \quad (11)$$

In some cases, the mixing loss $\mathcal{L}_{mixaug}$ is comparable to a repulsive force of contrastive learning, which encourages embeddings to be uniformly spread across a space. In some cases, training component 1920 updates the image generation parameters of GAN 1905 according to the mixing loss $\mathcal{L}_{mixaug}$. In some cases, both contrastive learning and learning using the mixing loss $\mathcal{L}_{mixaug}$ would act to minimize similarity between an unrelated x and c, but differ in that the logit of the mixing loss $\mathcal{L}_{mixaug}$ in equation (11) is not pooled with other pairs inside the logarithm, thereby encouraging stability, as it is not affected by hard negatives of the minibatch.

Accordingly, in some cases, loss 1950 comprises $\mathcal{L}_{GAN,real}$, $\mathcal{L}_{GAN,fake}$, $\mathcal{L}_{mixaug}$, or a combination thereof.

FIG. 20 shows an example of a computing device 2000 according to aspects of the present disclosure. In one aspect, computing device 2000 includes processor(s) 2005, memory subsystem 2010, communication interface 2015, I/O interface 2020, user interface component(s) 2025, and channel 2030.

In some embodiments, computing device 2000 is an example of, or includes aspects of, the image generation apparatus as described with reference to FIGS. 1 and 4. In some embodiments, computing device 2000 includes one or more processors 2005 that can execute instructions stored in memory subsystem 2010 to obtain an input image having a first resolution, wherein the input image includes random noise; generate, using a diffusion model, a low-resolution image based on the input image, wherein the low-resolution image has the first resolution; and generate, using a generative adversarial network (GAN), a high-resolution image based on the low-resolution image, wherein the high-resolution image has a second resolution that is greater than the first resolution.

According to some aspects, processor(s) 2005 are included in the processor unit as described with reference to FIG. 4. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 2010 includes one or more memory devices. Memory subsystem 2010 is an example of, or includes aspects of, the memory unit as described with reference to FIG. 4. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2015 operates at a boundary between communicating entities (such as computing device 2000, one or more user devices, a cloud, and one or more databases) and channel 2030 and can record and process communications. In some cases, communication interface 2015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2020 is controlled by an I/O controller to manage input and output signals for computing device 2000. In some cases, I/O interface 2020 manages peripherals not integrated into computing device 2000. In some cases, I/O interface 2020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2020 or via hardware components controlled by the I/O controller.

According to some aspects, user interface component(s) 2025 enable a user to interact with computing device 2000. In some cases, user interface component(s) 2025 include an audio device, such as an external speaker system, an external display device such as a display screen, an input device (e.g., a remote-control device interfaced with a user interface directly or through the I/O controller), or a combination thereof. In some cases, user interface component(s) 2025 include a GUI.

The description and drawings described herein represent example configurations and do not represent all the implementations within the scope of the aspects. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following aspects, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:

obtaining an input image having a first resolution, wherein the input image includes random noise;

generating, using a diffusion model, a low-resolution image based on the input image, wherein the low-resolution image has the first resolution; and generating, using a generative adversarial network (GAN), a high-resolution image based on the low-resolution image, wherein the high-resolution image has a second resolution that is greater than the first resolution.

2. The method of claim 1, further comprising:

generating, using a text encoder, a text embedding, wherein the high-resolution image is generated based on the text embedding.

3. The method of claim 2, wherein:

the diffusion model and the GAN each take the text embedding as input.

4. The method of claim 1, further comprising:

generating, using an image encoder, an image embedding, wherein the high-resolution image is generated based on the image embedding.

5. The method of claim 4, wherein:

the diffusion model and the GAN each take the image embedding as input.

6. The method of claim 1, wherein:

the diffusion model contains more parameters than the GAN.

7. The method of claim 1, wherein:

the low-resolution image is generated using multiple iterations of the diffusion model and the high-resolution image is generated using a single iteration of the GAN.

8. The method of claim 1, wherein:

at least one side of the low-resolution image comprises 128 pixels and at least one side of the high-resolution image comprises 1024 pixels.

9. The method of claim 1, wherein:

an aspect ratio of the low-resolution image is different from 1:1 and the same as an aspect ratio of the high-resolution image.

10. The method of claim 1, wherein:

the diffusion model and the GAN take variable resolution inputs.

11. A non-transitory computer readable medium storing instructions that, when executed by a processor, cause the processor to:

obtain an input image having a first resolution, wherein the input image includes random noise;

generate, using a diffusion model, a low-resolution image based on the input image, wherein the low-resolution image has the first resolution; and generate, using a generative adversarial network (GAN), a high-resolution image based on the low-resolution image, wherein the high-resolution image has a second resolution that is greater than the first resolution.

12. The non-transitory computer readable medium of claim 11, wherein the instructions further cause the processor to:

generate, using a text encoder, a text embedding, wherein the high-resolution image is generated based on the text embedding.

13. The non-transitory computer readable medium of claim 12, wherein:

the diffusion model and the GAN each take the text embedding as input.

14. The non-transitory computer readable medium of claim 11, wherein the instructions further cause the processor to:

generate an image embedding using an image encoder, wherein the high-resolution image is generated based on the image embedding.

15. The non-transitory computer readable medium of claim 14, wherein:

the diffusion model and the GAN each take the image embedding as input.

16. The non-transitory computer readable medium of claim 11, wherein:

the low-resolution image is generated using multiple iterations of the diffusion model and the high-resolution image is generated using a single iteration of the GAN.

17. A system for image generation, wherein the system comprises:

one or more processors;

one or more memory components coupled with the one or more processors;

a diffusion model comprising diffusion parameters stored in the one or more memory components, the diffusion model trained to generate a low-resolution image; and a generative adversarial network (GAN) comprising GAN parameters stored in the one or more memory components, the GAN trained to generate a high-resolution image based on the low-resolution image from the diffusion model.

18. The system of claim 17, the system further comprising:

a text encoder comprising text encoding parameters, the text encoder trained to generate a text embedding.

19. The system of claim 17, the system further comprising:

an image encoder comprising image encoding parameters, the image encoder trained to generate an image embedding.

20. The system of claim 17, wherein:

the low-resolution image is generated using multiple iterations of the diffusion model and the high-resolution image is generated using a single iteration of the GAN.

\* \* \* \* \*